(12) United States Patent
Mishima

(10) Patent No.: US 12,537,139 B2
(45) Date of Patent: Jan. 27, 2026

(54) MULTILAYER CERAMIC ELECTRONIC COMPONENT

(71) Applicant: Murata Manufacturing Co., Ltd., Nagaokakyo (JP)

(72) Inventor: Yasuhiro Mishima, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 54 days.

(21) Appl. No.: 18/619,245

(22) Filed: Mar. 28, 2024

(65) Prior Publication Data

US 2024/0249889 A1    Jul. 25, 2024

Related U.S. Application Data

(63) Continuation of application No. PCT/JP2022/041769, filed on Nov. 9, 2022.

(30) Foreign Application Priority Data

Nov. 26, 2021   (JP) .................. 2021-192512

(51) Int. Cl.
*H01G 4/30* (2006.01)
*H01G 2/06* (2006.01)
(Continued)

(52) U.S. Cl.
CPC ............... *H01G 4/30* (2013.01); *H01G 2/065* (2013.01); *H01G 4/008* (2013.01); *H01G 4/012* (2013.01); *H01G 4/1227* (2013.01)

(58) Field of Classification Search
CPC .......... H01G 4/30; H01G 2/065; H01G 4/008; H01G 4/012; H01G 4/1227
See application file for complete search history.

(56) References Cited

U.S. PATENT DOCUMENTS

2009/0040688 A1    2/2009   Kayatani
2014/0043724 A1    2/2014   Kang et al.
(Continued)

FOREIGN PATENT DOCUMENTS

JP    H11162771 A    6/1999
JP    2014039000 A   2/2014
(Continued)

OTHER PUBLICATIONS

International Search Report in PCT/JP2022/041769, mailed Jan. 24, 2023, 3 pages.
(Continued)

*Primary Examiner* — Michael P Mcfadden
(74) *Attorney, Agent, or Firm* — Keating & Bennett, LLP

(57) ABSTRACT

A multilayer ceramic capacitor includes a multilayer body including ceramic layers and internal electrode layers, and external electrodes at both end surfaces of the multilayer body and each including a base electrode layer, a conductive resin layer on the base electrode layer, and a plated layer. The conductive resin layer includes an end-surface-side conductive resin layer portion on both end surfaces, and an adjacent conductive resin layer portion extending from an end portion of the end-surface-side conductive resin layer portion to be located on both main surfaces and both lateral surfaces. A content ratio of a resin component included in the adjacent conductive resin layer portion is greater than a content ratio of a resin component included in the end-surface-side conductive resin layer portion, and the content ratio of the resin component in the end-surface-side conductive resin layer portion is at least about 10% and no more than about 60%.

20 Claims, 5 Drawing Sheets

(51) Int. Cl.
*H01G 4/008* (2006.01)
*H01G 4/012* (2006.01)
*H01G 4/12* (2006.01)

(56) References Cited

U.S. PATENT DOCUMENTS

| | | |
|---|---|---|
| 2014/0375175 A1 | 12/2014 | Hamanaka et al. |
| 2015/0077898 A1* | 3/2015 | Chung .................... H01G 4/30 427/79 |
| 2016/0099110 A1* | 4/2016 | Lee ......................... C09D 5/24 252/514 |
| 2018/0090271 A1* | 3/2018 | Ito ........................ H01G 4/1209 |
| 2018/0174753 A1* | 6/2018 | Terashita ............... H01G 4/008 |
| 2020/0043659 A1* | 2/2020 | Kim ...................... H01G 4/2325 |
| 2020/0185153 A1* | 6/2020 | Yun ...................... H01G 4/2325 |
| 2021/0057155 A1 | 2/2021 | Zenzai et al. |
| 2021/0057162 A1 | 2/2021 | Yamamoto |
| 2021/0098193 A1* | 4/2021 | Mishima ................ H01G 2/065 |
| 2022/0139618 A1* | 5/2022 | Kang ..................... H01G 4/232 361/273 |
| 2022/0392707 A1* | 12/2022 | Lee ......................... H01G 4/12 |

FOREIGN PATENT DOCUMENTS

| | | |
|---|---|---|
| JP | 2021034440 A | 3/2021 |
| JP | 2021034458 A | 3/2021 |
| JP | 2021052129 A | 4/2021 |
| KR | 20080111557 A | 12/2008 |
| KR | 20140147690 A | 12/2014 |

OTHER PUBLICATIONS

Written Opinion in PCT/JP2022/041769, mailed Jan. 24, 2023, 3 pages.
Official Communication issued in corresponding European Patent Application No. 22898404.3, mailed on Oct. 29, 2025, 8 pages.

* cited by examiner

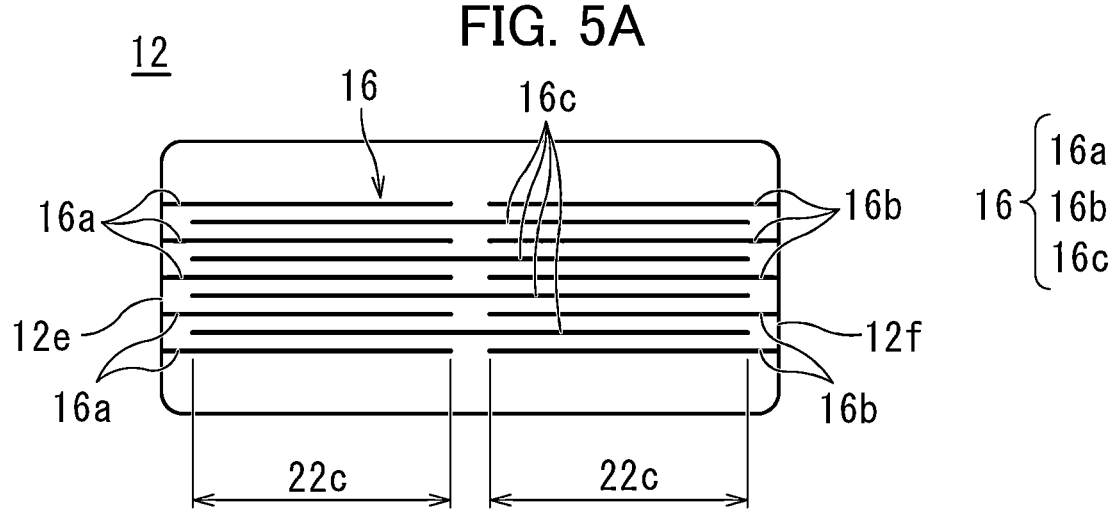
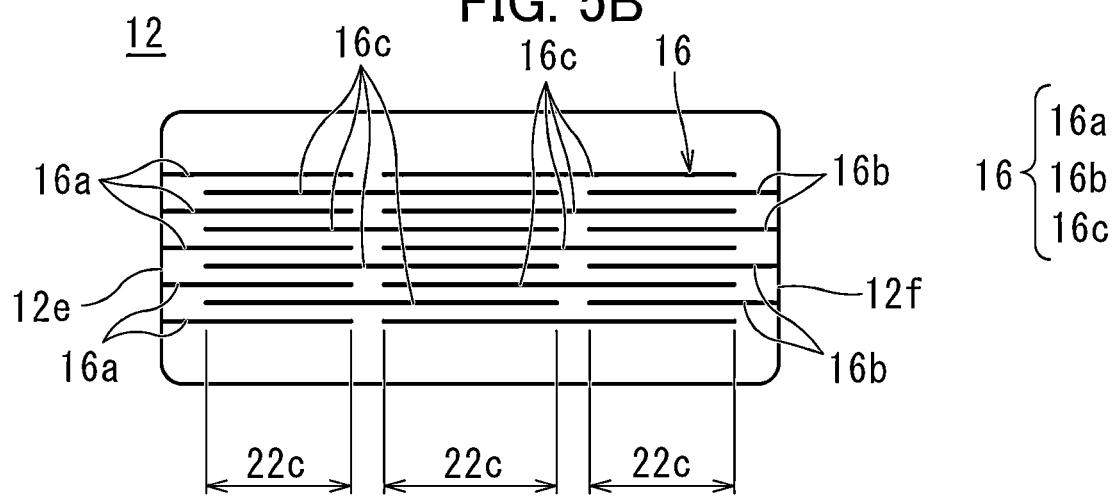
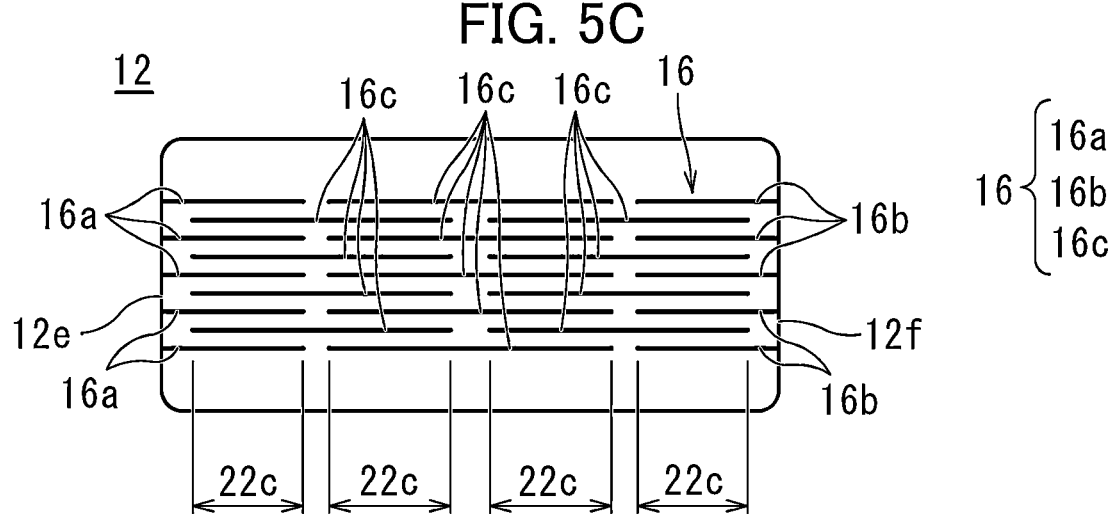

MULTILAYER CERAMIC ELECTRONIC COMPONENT

CROSS REFERENCE TO RELATED APPLICATIONS

This application claims the benefit of priority to Japanese Patent Application No. 2021-192512 filed on Nov. 26, 2021 and is a Continuation Application of PCT Application No. PCT/JP2022/041769 filed on Nov. 9, 2022. The entire contents of each application are hereby incorporated herein by reference.

BACKGROUND OF THE INVENTION

1. Field of the Invention

The present invention relates to multilayer ceramic electronic components.

2. Description of the Related Art

In the related art, a multilayer ceramic electronic component of which a multilayer ceramic capacitor is representative have come to be used under more severe environments than before. For example, for electronic components which can be used in a mobile device such as a mobile telephone or portable music player, it has been demanded to be able to withstand the impact when falling. More specifically, even if subjected to an impact due to falling, it is necessary that the multilayer ceramic electronic component does not fall off from the mounting substrate, and that cracking does not occur in the multilayer ceramic electronic component.

In addition, for electronic components which can be used in on-board devices such as an ECU (Electronic Control Unit), it has been demanded to resist the shock of thermal cycling. More specifically, it is necessary that cracks do not occur in the multilayer ceramic component even if subjected to deflection stress generated by being subjected to thermal cycling and the mounting substrate thermally expanding and contracting.

In response to this, it has been proposed to use a thermosetting conductive resin paste in the external electrodes of the multilayer ceramic electronic component. For example, in Japanese Unexamined Patent Application, Publication No. H11-162771, an epoxy-based thermosetting resin layer is formed between a conventional electrode layer and Ni plating, and measures are taken to prevent cracking in the capacitor body even if exposed to a severe environment (improvement in deflection resistance).

With such a configuration, upon receiving stress from an impact due to falling, or deflection stress occurring by being subjected to thermal cycling and the mounting substrate thermally expanding and contracting, for the stress transmitted to the mounting substrate (distortion of mounting substrate), stress is relieved by peeling between the electrode layer and epoxy-based thermosetting resin layer starting from the leading end of the epoxy-based thermosetting resin layer to reduce or prevent cracking in the capacitor body.

SUMMARY OF THE INVENTION

However, since the metal components included in the epoxy-based thermosetting resin layer increase the hardness and elastic modulus of the resin electrode, it leads to a disadvantage in the improvement of mechanical stress, and since the resin component included in the epoxy-based thermosetting resin layer does not have conductivity, it leads to a disadvantage in the ESR (equivalent series resistance) characteristic. For this reason, in a multilayer ceramic electronic component such that has a epoxy-based thermosetting resin layer, since the above-mentioned improvement in mechanical strength and ESR characteristic are in a tradeoff relationship, it may be difficult to effectively achieve the characteristics of both.

Therefore, example embodiments of the present invention provide multilayer ceramic electronic components which each achieve desired ESR characteristics and improved mechanical strength.

A multilayer ceramic electronic component according to an example embodiment of the present invention includes a multilayer body including a plurality of laminated ceramic layers, a first main surface and a second main surface opposite in a height direction, a first lateral surface and a second lateral surface opposite in a width direction which is orthogonal or substantially orthogonal to the height direction, and a first end surface and a second end surface opposite in a length direction which is orthogonal or substantially orthogonal to the height direction and the width direction, a first internal electrode layer provided on the plurality of ceramic layers and exposed at the first end surface, a second internal electrode layer provided on the plurality of ceramic layers and exposed at the second end surface, a first external electrode electrically connected with the first internal electrode layer and provided on the first end surface at a portion of the first main surface, at a portion of the second main surface, at a portion of the first lateral surface and at a portion of the second lateral surface; and a second external electrode electrically connected with the second internal electrode layer and provided on the second end surface at a portion of the first main surface, at a portion of the second main surface, at a portion of the first lateral surface and at a portion of the second lateral surface; in which the first external electrode and the second external electrode include a base electrode layer including a metal component and a glass component, a conductive resin layer including a metal component and a resin component provided on the base electrode layer, and a plated layer provided on the conductive resin layer, the conductive resin layer includes an end-surface-side conductive resin layer portion located on the first end surface and the second end surface, and an adjacent conductive resin layer portion extending from an end portion of the end-surface-side conductive resin layer portion to be located on the first main surface, on the second main surface, on the first lateral surface and on the second lateral surface, and when defining a total amount of resin component and metal component in the end-surface-side conductive resin layer portion and the adjacent conductive resin layer portion as 100%, a content ratio of the resin component included in the adjacent conductive resin layer portion is greater than a content ratio of the resin component included in the end-surface-side conductive resin layer portion, and a content ratio of the resin component in the end-surface-side conductive resin layer portion is at least about 10% and no more than about 60%.

A multilayer ceramic electronic component according to an example embodiment of the present invention has a structure in which the first external electrode and the second external electrode include a base electrode layer including a metal component and a glass component, a conductive resin layer including a metal component and a resin component provided on the base electrode layer, and a plated layer provided on the conductive resin layer, the conductive resin layer includes an end-surface-side conductive resin layer portion located on the first end surface and the second end surface, and an adjacent conductive resin layer portion extending from an end portion of the end-surface-side conductive resin layer portion to be located on the first main surface, on the second main surface, on the first lateral surface and on the second lateral surface, and when defining a total amount of resin component and metal component in the end-surface-side conductive resin layer portion and the adjacent conductive resin layer portion as 100%, a content ratio of the resin component included in the adjacent conductive resin layer portion is greater than a content ratio of the resin component included in the end-surface-side conductive resin layer portion, and a content ratio of the resin component in the end-surface-side conductive resin layer portion is at least about 10% and no more than about 60%. For this reason, it becomes possible to improve the conductivity in the end-surface-side conductive resin layer portion having a large content ratio of metal component, a result of which it is possible to decrease the ESR of the multilayer ceramic electronic component. In addition, at the adjacent conductive resin layer portion having a large content ratio of the resin component, since it is possible to impart sufficient elasticity, upon receiving stress due to an impact when falling, or deflection stress generated by being subjected to thermal cycling and the mounting substrate thermally expanding being generated, for the stress transmitted to the mounting substrate (mounting substrate distortion), it is possible for peeling off to occur between the base electrode layer and adjacent conductive resin layer with the starting point of the leading end of the adjacent conductive resin layer portion, and possible to fracture cohesion inside of the adjacent conductive resin layer portion. It thereby becomes possible to relieve the stress and reduce or prevent cracking in the multilayer body, and thus the mechanical strength of the multilayer ceramic electronic component can be improved.

According to example embodiments of the present invention, multilayer ceramic electronic components are provided to have desired ESR characteristics and improved mechanical strength.

The above and other elements, features, steps, characteristics and advantages of the present invention will become more apparent from the following detailed description of the example embodiments with reference to the attached drawings.

BRIEF DESCRIPTION OF THE DRAWINGS

FIG. 5A is a cross-sectional view along the line II-II in FIG. 1 showing the structure of an internal electrode layer of the multilayer ceramic capacitor according to an example embodiment of the present invention in which counter electrode is divided into two.

FIG. 5B is a cross-sectional view along the line II-II in FIG. 1 showing the structure of an internal electrode layer of the multilayer ceramic capacitor according to an example embodiment of the present invention in which counter electrode is divided into three.

FIG. 5C is a cross-sectional view along the line II-II in FIG. 1 showing the structure of an internal electrode layer of the multilayer ceramic capacitor according to an example embodiment of the present invention in which counter electrode is divided into four.

DETAILED DESCRIPTION OF THE EXAMPLE EMBODIMENTS

1. Multilayer Ceramic Capacitor

As an example of a multilayer ceramic electronic component according to an example embodiment of the present invention, a multilayer ceramic capacitor will be explained.

Figure 1:
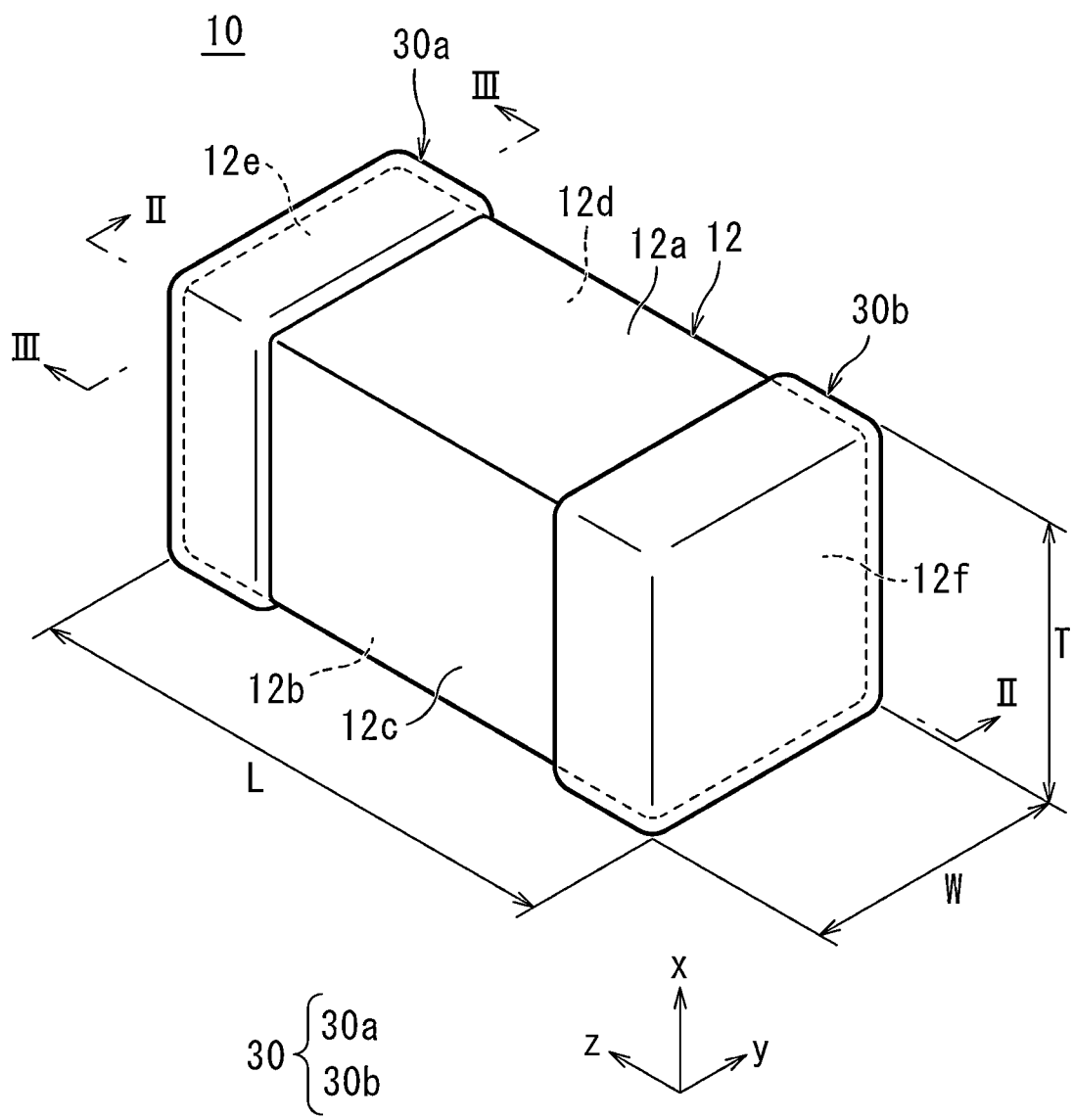
FIG. 1 is an external perspective view showing an example of a multilayer ceramic capacitor as a multilayer ceramic electronic component according to an example embodiment of the present invention.
Figure 2:
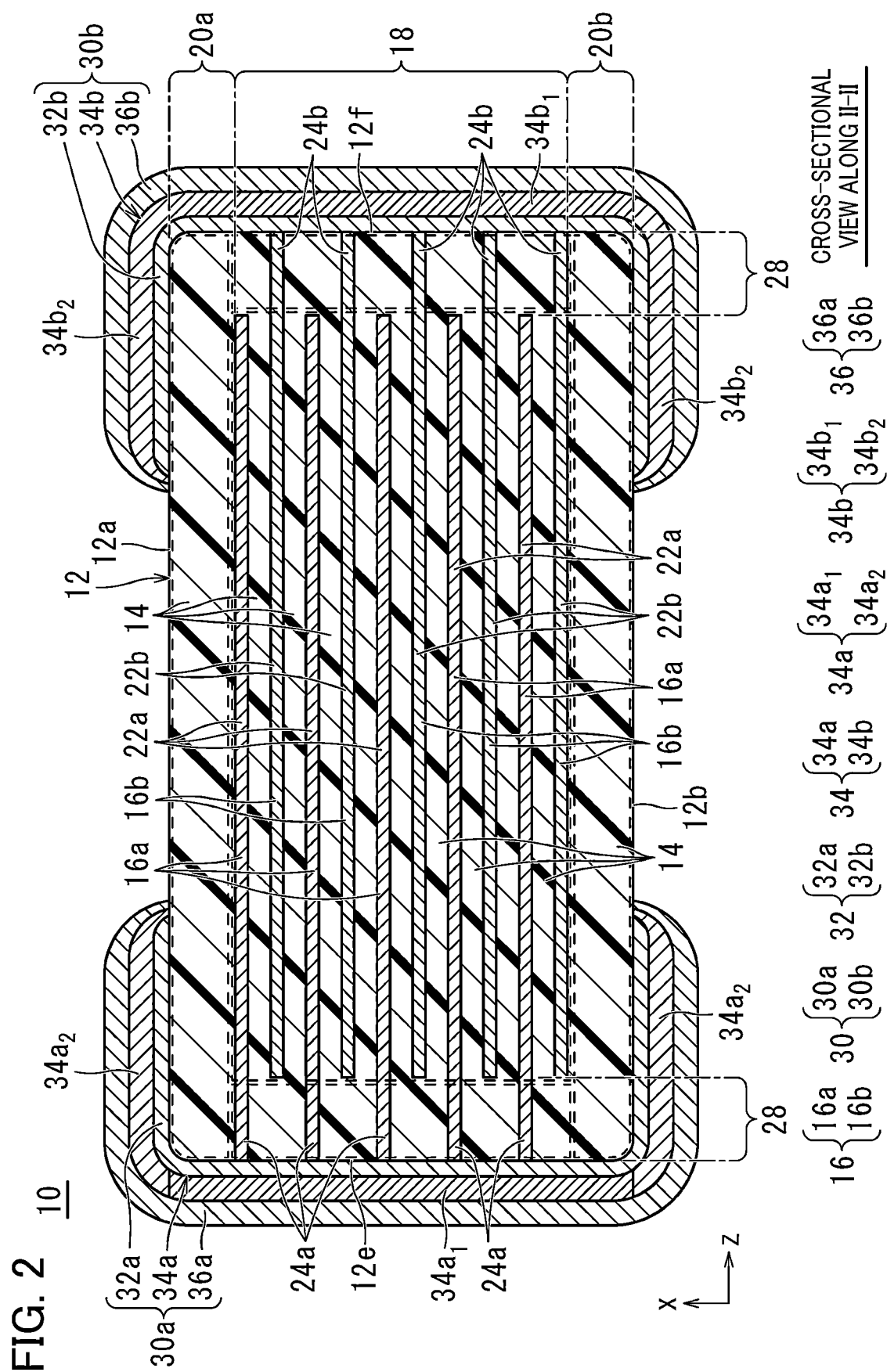
FIG. 2 is a cross-sectional view along the line II-II in FIG. 1.
Figure 3:
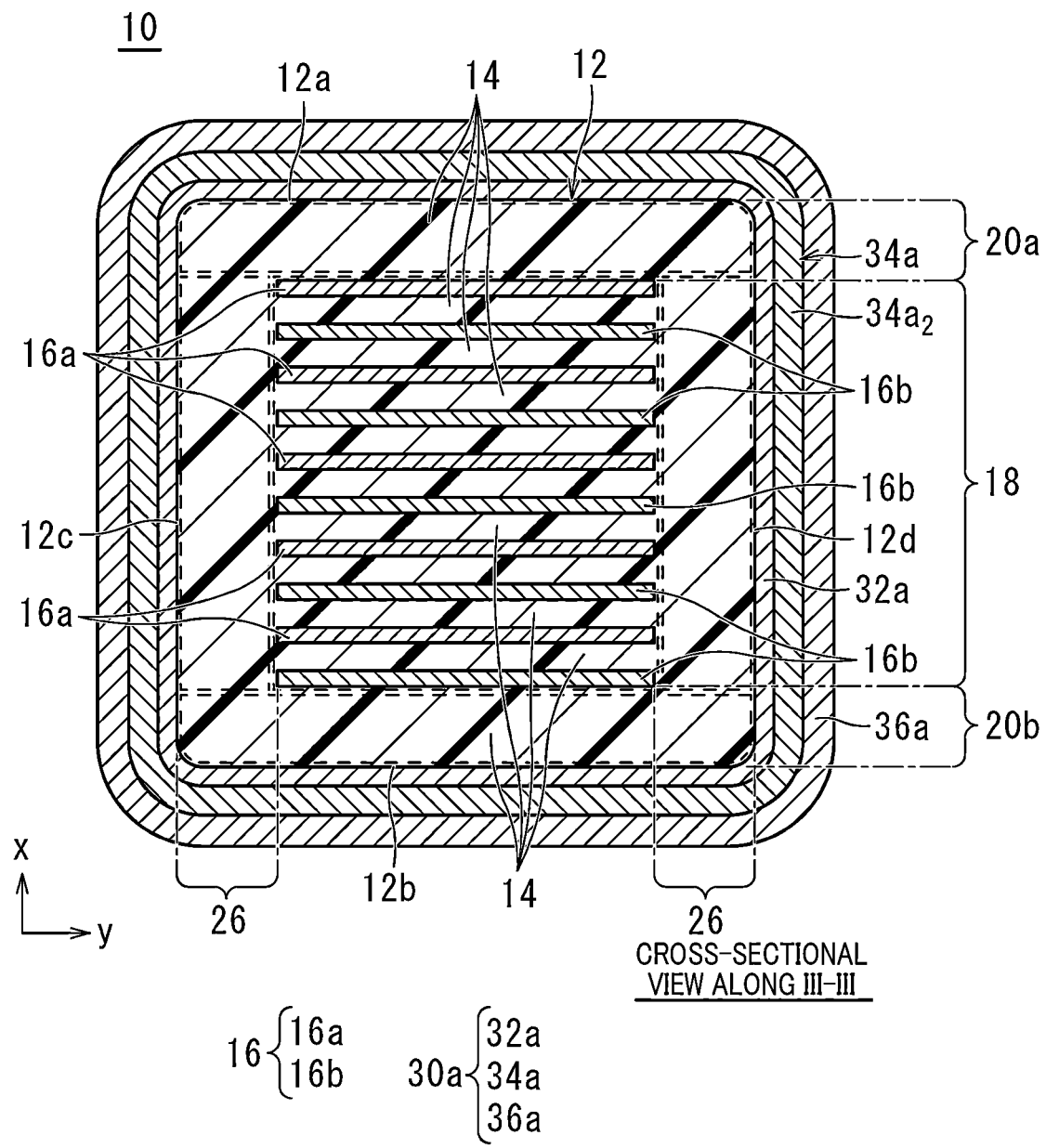
FIG. 3 is a cross-sectional view along the line III-III in FIG. 1.
Figure 4:
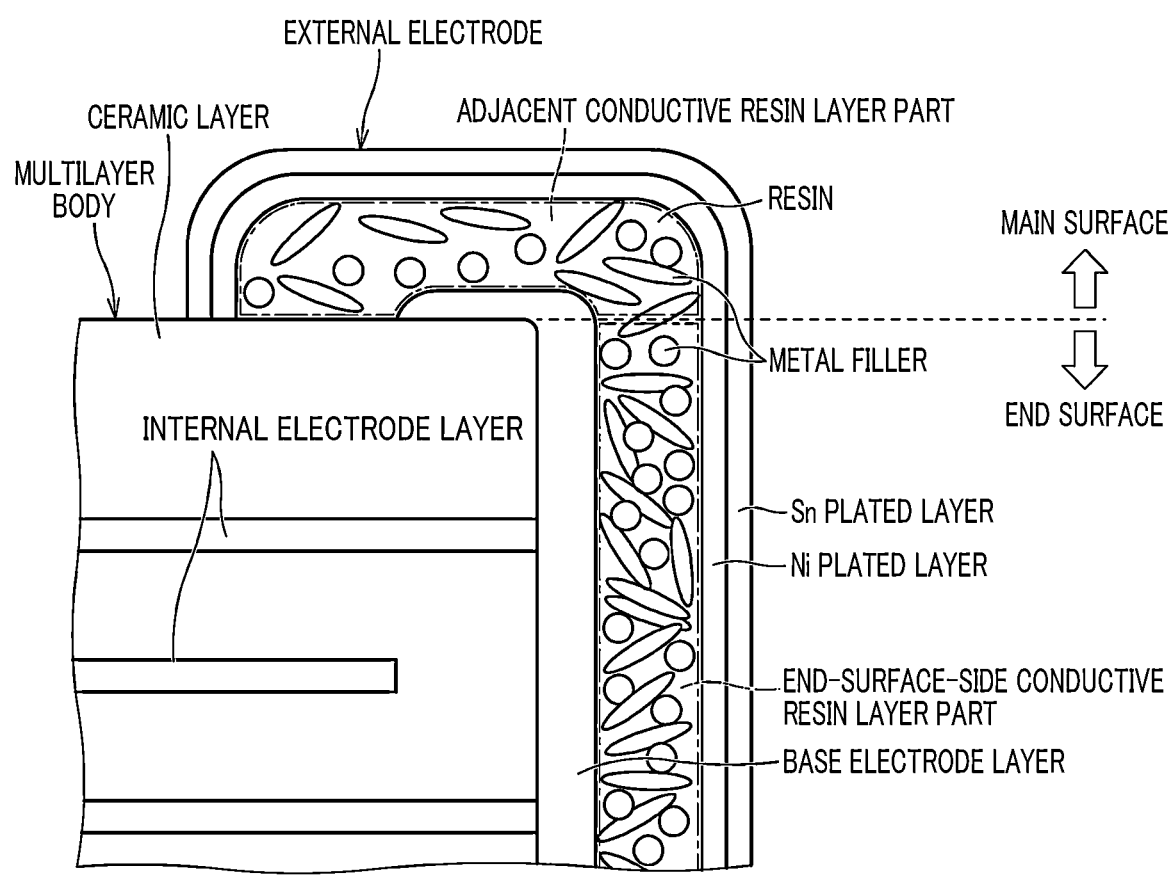
FIG. 4 is a schematic cross-sectional view showing the structure of an external electrode.

FIG. 1 is an external perspective view showing an example of a multilayer ceramic capacitor as a multilayer ceramic electronic component according to an example embodiment of the present invention. FIG. 2 is a cross-sectional view along the line II-II in FIG. 1. FIG. 3 is a cross-sectional view along the line III-III in FIG. 1. FIG. 4 is a schematic cross-sectional view showing the structure of an external electrode.

As shown in FIGS. 1 to 3, the multilayer ceramic capacitor 10 includes a rectangular or substantially rectangular parallelepiped-shape multilayer body 12, and an external electrode 30 provided on both ends of the multilayer body 12.

The multilayer body 12 includes a plurality of laminated ceramic layers 14, and a plurality of internal electrode layers 16 laminated on the ceramic layer 14. Furthermore, the multilayer body 12 includes a first main surface 12a and a second main surface 12b opposing in a height direction x, a first lateral surface 12c and a second lateral surface 12d opposing in a width direction y orthogonal or substantially orthogonal to the height direction x, and a first end surface 12e and a second end surface 12f opposing in a length direction z orthogonal or substantially orthogonal to the height direction x and width direction y. This multilayer body 12 is rounded at corner portions and ridge portions. It should be noted that the corner portion is a portion at which three adjacent surfaces of the multilayer body intersect, and ridge portion is a portion at which two adjacent surface of the multilayer body intersect. In addition, unevenness or the like may be formed in a portion or an entirety of the first main surface 12a and second main surface 12b, the first lateral surface 12c and second lateral surface 12d and first end surface 12e and second end surface 12f. The ceramic layer 14 and internal electrode layer 16 are laminated in the height direction x.

As shown in FIGS. 2 and 3, the multilayer body 12, in a lamination direction linking first main surfaces 12a and second main surface 12b, includes an effective layer portion 18 at which a plurality of internal electrode layers 16 are opposing, a first outer layer portion 20a including a plurality of ceramic layers 14 positioned between the internal electrode layer 16 located closest to the side of the first main surface 12a and the first main surface 12a, and a second outer layer portion 20b including a plurality of ceramic layers 14 positioned between the internal electrode layer 16 located closest to the side of the second main surface 12b and the second main surface 12b.

The first outer layer portion 20a is positioned at the side of the first main surface 12a of the multilayer body 12, and is an aggregate body of a plurality of ceramic layers 14 located between the first main surface 12a and the internal electrode layer 16 closest to the first main surface 12a.

The second outer layer portion 20b is positioned at the second main surface 12b side of the multilayer body 12, and is an aggregate body of a plurality of the ceramic layers 14 located between the second main surface 12b and the internal electrode layer 16 closest to the second main surface 12b.

Then, the region sandwiched by the first outer layer portion 20a and the second outer layer portion 20b is the effective layer portion 18. The number of laminated ceramic layers 14 is not particularly limited. However, it is preferable to include the first outer layer portion 20a and second outer layer portion 20b, and include at least 10 and no more than 700 layers, for example. In addition, the thickness of the ceramic layer 14 is preferably at least about 0.5 µm and no more than about 15.0 µm, for example.

The dimensions of the multilayer body 12 are not particularly limited. However, it is preferable that dimensions do not exceed the dimensions of the multilayer ceramic capacitor 10, including the thickness of the external electrode 30.

The ceramic layer 14, for example, can be formed by a dielectric material as the ceramic material. As such a dielectric material, for example, it is possible to use a dielectric ceramic including components such as $BaTiO_3$, $CaTiO_3$, $SrTiO_3$ or $CaZrO_3$. In the case of including the above-mentioned dielectric material as the main component, a material made by adding auxiliary components in a smaller content than the main component such as Mn compound, Fe compound, Cr compound, Co compound, or Ni compound, for example, may be used according to the desired characteristics of the multilayer body 12.

It should be noted, in the case of using a piezoelectric ceramic material in the ceramic layer 14, the multilayer ceramic electronic component functions as the piezoelectric component. As specific examples of the piezoelectric ceramic material, for example, a PZT (lead zirconate titanate)-based ceramic material or the like can be exemplified. In addition, in the case of using a semiconductor ceramic material in the ceramic layer 14, the multilayer ceramic electronic component functions as a thermistor. As specific examples of the semiconductor ceramic material, for example, a spinel ceramic material or the like can be exemplified. In addition, in the case of using a magnetic ceramic material in the ceramic layer 14, the multilayer ceramic electronic component functions as an inductor. In addition, in the case of functioning as an inductor, the internal electrode layer 16 preferably is a coil-shaped conductor or the like. As specific examples of the magnetic ceramic material, for example, a ferrite ceramic material or the like can be exemplified.

The thickness of the fired ceramic layer 14 is preferably at least about 0.5 µm and no more than about 15 µm, for example. The number of laminated ceramic layers 14 is preferably at least 10 and no more than 700. It should be noted that this number of ceramic layers 14 is the total number of the number of ceramic layers 14 of the effective layer portion 18, and the number of ceramic layers 14 of the first outer layer portion 20a and second outer layer portion 20b.

The multilayer body 12 includes, as the plurality of internal electrode layers 16, a plurality of first internal electrode layers 16a and a plurality of second internal electrode layers 16b which are substantially rectangular, for example. The plurality of first internal electrode layers 16a and plurality of second internal electrode layers 16b are embedded so as to be alternately located at equal intervals sandwiching the ceramic layer 14 along the height direction x of the multilayer body 12.

The first internal electrode layer 16a is provided on a plurality of the ceramic layers 14, and is positioned inside of the multilayer body 12. The first internal electrode layer 16a includes a first counter electrode portion 22a opposing the second internal electrode layer 16b, and a first extraction electrode portion 24a positioned on one end side of the first internal electrode layer 16a from the first counter electrode portion 22a until a first end surface 12e of the multilayer body 12. The first extraction electrode portion 24a includes an end portion thereof drawn to the surface of the first end surface 12e, and is exposed from the multilayer body 12.

The shape of the first counter electrode portion 22a of the first internal electrode layer 16a is not particularly limited, but is preferably a rectangular or substantially rectangular shape in a plan view. Naturally, the corner portions in a plan view may be rounded, or the corner portions may be formed obliquely in a plan view (tapered). In addition, it may be a tapered shape in a plan view with an incline as approaching either direction.

The shape of the first extraction electrode 24a of the first internal electrode layer 16a is not particularly limited, but is preferably a rectangular or substantially rectangular shape in a plan view. Naturally, the corner portions in a plan view may be rounded, or the corner portions may be formed obliquely in a plan view (tapered). In addition, it may be a tapered shape in a plan view with an incline as approaching either direction.

The width of the first counter electrode portion 22a of the first internal electrode layer 16a and the width of the first extraction electrode layer 24a of the first internal electrode layer 16a may have the same width, or either width may be narrower.

The second internal electrode layer 16b is provided on the plurality of ceramic layers 14, and is located inside of the multilayer body 12. The second internal electrode layer 16b includes a second counter electrode portion 22b opposing the first internal electrode layer 16a, and a second extraction electrode portion 24b located at one end side of the second internal electrode layer 16b from the second counter electrode portion 22b until the second end surface 12f of the multilayer body 12. The second extraction electrode portion 24b has an end thereof drawn out to a surface of the second end surface 12f, and exposed from the multilayer body 12.

The shape of the second counter electrode portion 22b of the second internal electrode layer 16b is not particularly limited, but is preferably a rectangular or substantially rectangular shape in a plan view. Naturally, the corner portions in a plan view may be rounded, or the corner portions may be formed obliquely in a plan view (tapered). In addition, it may be a tapered shape in a plan view with an incline as approaching either direction.

The shape of the second extraction electrode portion 24b of the second internal electrode layer 16b is not particularly limited, but is preferably a rectangular or substantially rectangular shape in a plan view. Naturally, the corner portions in a plan view may be rounded, or the corner portions may be formed obliquely in a plan view (tapered). In addition, it may be a tapered shape in a plan view with an incline as approaching either direction.

The width of the second counter electrode portion 22b of the second internal electrode layer 16b, and the width of the second extraction electrode portion 24b of the second internal electrode layer 16b may have the same width, or either width may be narrower.

Furthermore, as shown in FIG. 2, the multilayer body 12 includes an end portion (hereinafter referred to as "L gap") 28 of the multilayer body 12 between an end portion of the first internal electrode layer 16a on an opposite side to the first extraction electrode portion 24a and the second end surface 12f, and between an end portion of the second internal electrode layer 16b on an opposite side to the second extraction electrode portion 24b and the first end surface 12e.

As shown in FIG. 3, the multilayer body 12 includes a lateral portion (hereinafter referred to as "W gap") 26 of the multilayer body 12 between an end in the width direction y of the first counter electrode portion 22a and second counter electrode portion 22b, and the first lateral surface 12c, and between the other end in the width direction y of the first counter electrode portion 22a and second counter electrode portion 22b and the second lateral surface 12d.

The first internal electrode layer 16a and second internal electrode layer 16b, for example, can include appropriate conductive material such as metals such as Ni, Cu, Ag, Pd or Au, or alloys including at least one of these metals such as an Ag—Pd alloy.

The thickness of each of the internal electrode layers 16, i.e., first internal electrode layer 16a and second internal electrode layer 16b, is preferably at least about 0.2 µm and no more than about 2.0 µm, for example. In addition, the number of the first internal electrode layers 16a and second internal electrode layers 16b is preferably at least 10 and no more than 700 combined, for example.

As shown in FIGS. 1 to 3, the external electrode 30 is provided on the first end surface 12e side and the second end surface 12f side of the multilayer body 12.

The external electrode 30 includes the first external electrode 30a and second external electrode 30b.

The first external electrode 30a is connected to the first internal electrode layer 16a, and is located at the surface of at least the first end surface 12e. In addition, the first external electrode 30a extends from the first end surface 12e of the multilayer body 12 to a portion of the first main surface 12a and a portion of the second main surface 12b, as well as a portion of the first lateral surface 12c and a portion of the second lateral surface 12d. In this case, the first external electrode 30a is electrically connected with the first extraction electrode portion 24a of the first internal electrode layer 16a.

The second external electrode 30b is connected to the second internal electrode layer 16b, and is provided on at least the surface of the second end surface 12f. In addition, the second external electrode 30b is arranged to extend from the second end surface 12f to a portion of the first main surface 12a and a portion of the second main surface 12b, as well as a portion of the first lateral surface 12c and a portion of the second lateral surface 12d. In this case, the second external electrode 30b is electrically connected with the second extraction electrode portion 24b of the second internal electrode layer 16b.

Inside the multilayer body 12, electrostatic capacitance is generated by the first counter electrode portion 22a of the first internal electrode layer 16a and the second counter electrode portion 22b of the second internal electrode layer 16b opposing each other via the ceramic layer 14. For this reason, it is possible to obtain electrostatic capacitance between the first external electrode 30a to which the first internal electrode layer 16a is connected, and the second external electrode 30b to which the second internal electrode layer 16b is connected, whereby the characteristics of a capacitor are expressed.

In addition, the multilayer body 12 shown in FIG. 1 may have a structure in which a floating internal electrode layer 16c. which is not drawn out is provided to either of the first end surface 12e and second end surface 12f, in addition to the first internal electrode layer 16a and second internal electrode layer 16b, and the counter electrode portion 22c is divided into many by the floating electrode layer 16c, as shown in FIGS. 5A to 5C. For example, it is a two-portion structure shown in FIG. 5B, three-portion structure shown in FIG. 5B, or a four-portion structure such as that shown in FIG. 5C, or it may be a four or more-portion structure. In this way, by establishing a structure dividing the counter electrode portion 22c into several pieces, it becomes a configuration in which a plurality of capacitor components are provided between the opposing internal electrode layers 16a, 16b, 16c, and these capacitor components are connected in parallel. For this reason, the voltage applied to each of the capacitor components is low, whereby it is possible to achieve raised voltage resistance of the multilayer ceramic capacitor 10.

The external electrode 30 includes a base electrode layer 32 including a metal component and glass component, a conductive resin layer 34 including a metal component and resin component provided on the base electrode layer 32, and a plated layer 36 provided on the conductive resin layer 34. The first external electrode 30a includes a first base electrode layer 32a including the metal component and glass component, and a first conductive resin layer 34a including a metal component and resin component provided on the first base electrode layer 32a, and a first plated layer 36a provided on the first conductive resin layer 34a. The second external electrode 30b includes a second base electrode layer 32b including a metal component and glass component, a second conductive resin layer 34b including a metal component and resin component provided on the second base electrode layer 32b, and a second plated layer 36b provided on the second conductive resin layer 34b.

The base electrode layer 32 includes a first base electrode layer 32a and second base electrode layer 32b.

The first base electrode layer 32a is connected to the first internal electrode layer 16a, and located at the surface of the first end surface 12e. In addition, the first base electrode layer 32a extends from the first end surface 12e to a portion of the first main surface 12a and second main surface 12b, as well as a portion of the first lateral surface 12c and a portion of the second lateral surface 12d. In this case, the first base electrode layer 32a is electrically connected with the first extraction electrode portion 24a of the first internal electrode layer 16a.

The second base electrode layer 32b is connected to the second internal electrode layer 16b, and located at the surface of the second end surface 12f. In addition, the second base electrode layer 32b extends from the second end surface 12f to be located at a portion of the first main surface 12a and a portion of the second main surface 12b, as well as a portion of the first lateral surface 12c and a portion of the second lateral surface 12d. In this case, the second base electrode layer 32b is electrically connected with the second extraction electrode portion 24b of the second internal electrode layer 16b.

The base electrode layer 32 includes at least one of a fired layer, a thin film layer or the like. Hereinafter, the respective configurations in the case of establishing the base electrode layer 32 as the above fired layer and thin film layer will be explained.

The fired layer includes a glass component and a metal component. The glass component of the fired layer includes at least one of B, Si, Ba, Mg, Al, Li or the like. The metal component of the fired layer, for example, includes at least one of Cu, Ni, Ag, Pd, Ag—Pd alloy, Au or the like. The fired layer is a layer made by coating a conductive paste including a glass component and metal component on the multilayer body 12 and firing. The fired layer may be made by simultaneously firing a multilayer chip having an internal electrode layer 16 and ceramic layer 14 and a conductive paste coated on the multilayer chip, or may be made by firing a multilayer chip having an internal electrode layer 16 and ceramic layer 14 to obtain a multilayer body, followed by firing a conductive paste on the multilayer body. It should be noted that, for the fired layer, in the case of simultaneously firing the multilayer chip having the internal electrode layer 16 and ceramic layer 14, and the conductive paste coated on the multilayer chip, the fired layer is preferably formed by firing a layer obtained by adding a ceramic component in place of the glass component. The fired layer may include multiple layers.

It should be noted that, in the case of including a ceramic component in place of the glass component in the base electrode layer 32, it is possible to improve the adherence between the multilayer body 12 and base electrode layer 32. It should be noted that the base electrode layer 32 may include both the glass component and ceramic component.

The ceramic component included in the base electrode layer 32 may use the same type of ceramic material as the ceramic layer 14, or may use a different type of ceramic material. The ceramic component, for example, includes at least one of $BaTiO_3$, $CaTiO_3$, $(Ba,Ca)TiO_3$, $SrTiO_3$, or $CaZrO_3$ or the like.

The thickness in the length direction z linking the first end surface 12e and second end surface 12f at a central portion in the height direction x of the first base electrode layer 32a positioned at the first end surface 12e, for example, is preferably on the order of at least about 2 µm and no more than about 220 µm, for example. The thickness in the length direction z linking the first end surface 12e and second end surface 12f at the central portion in the height direction x of the second base electrode layer 32b positioned at the second end surface 12f, for example, is preferably on the order of at least about 2 µm and no more than about 220 µm.

The thickness in the height direction x linking the first main surface 12a and second main surface 12b at the central portion in the length direction z linking the first end surface 12e and second end surface 12f of the first base electrode layer 32a located at a portion of the first main surface 12a and second main surface 12b, for example, is preferably on the order of at least about 3 µm and no more than about 40 µm. The thickness in the height direction x linking the first main surface 12a and second main surface 12b at a central portion in the length direction z linking the first end surface 12e and second end surface 12f of the second base electrode layer 32b located at a portion of the first main surface 12a and second main surface 12b, for example, is preferably on the order of at least about 3 µm and no more than about 40 µm.

The thickness in the width direction y linking the first lateral surface 12c and second lateral surface 12d at a central portion in the length direction z linking the first end surface 12e and second end surface 12f of the first base electrode layer 32a located at a portion of the first lateral surface 12c and second lateral surface 12d, for example, is preferably on the order of at least about 3 µm and no more than about 40 µm. The thickness in the width direction y linking the first lateral surface 12c and second lateral surface 12d in the central portion in the length direction z linking the first end surface 12e and second end surface 12f of the second base electrode layer 32b positioned at a portion of the first lateral surface 12c and second lateral surface 12d, for example, is preferably on the order of at least about 3 µm and no more than about 40 µm.

The thin layer is a layer no more than about 1 µm formed by a thin film formation method such as sputtering or vapor deposition, and in which metal particles are deposited.

The conductive resin layer 34 is provided on the base electrode layer 32, and includes a resin component and metal component. The conductive resin layer 34 is arranged so as to completely cover the base electrode layer 32.

The conductive resin layer 34 has a first conductive resin layer 34a and second conductive resin layer 34b. The first conductive resin layer 34a is provided on the first base electrode layer 32a, and still the first conductive resin layer 34a is arranged so as to completely cover the first base electrode layer 32a, and the end portion of the first conductive resin layer 34a contacts the multilayer body 12. The second conductive resin layer 34b is provided on the second base electrode layer 32b, and still the second conductive resin layer 34b is arranged so as to completely cover the second base electrode layer 32b, and the end portion of the second conductive resin layer 34b contacts the multilayer body 12.

The conductive resin layer 34, due to including a thermosetting resin which is a resin component, for example, has more flexibility than the base electrode layer 32 including a plated film, and/or a fired product of a metal component and glass component. For this reason, even in a case of flexural stress acting on the mounting substrate, or an impact caused by physical shock or thermal cycling being applied to the multilayer ceramic capacitor 10, the conductive resin layer 34 will function as a buffer layer, and it is possible to prevent cracks from occurring in the multilayer ceramic capacitor 10.

As the thermosetting resin of the conductive resin layer 34, for example, it is possible to use various known thermosetting resins such as epoxy resin, phenoxy resin, phenolic resin, urethane resin, silicone resin, or polyimide resin. Among these materials, an epoxy resin superior in heat resistance, moisture resistance and adhesion is one of the most appropriate resins. In addition, the conductive resin layer 34 preferably includes a curing agent together with the thermosetting resin. As the curing agent, in the case of using an epoxy resin as the base resin, it is possible to use various known compounds such as phenol-based, amine-based, acid anhydride-based, imidazole-based, active ester-based or amideimide-based compounds as the curing agent of the epoxy resin.

The metal component included in the conductive resin layer 34 is a metal filler. The metal filler can employ Ag, Cu, Ni, Sn, or Bi or an alloy including these. In addition, it is possible to use metal powder with Ag coating on the surface of the metal powder. Upon using a powder coated with Ag on the surface of the metal powder, it is preferable to use Cu, Ni, Sn, Be or alloy powders of these as the metal powder. As the reason for using Ag as the metal filler, it is because Ag is suited to an electrode material due to having the lowest specific resistance among the metals, and Ag is a noble metal and has high weather resistance without oxidizing. In addition, this is because it is becomes possible to make the base metal cheaper, while maintaining the above characteristics of Ag.

As the metal filler included in the conductive resin layer 34, it is possible to use a filler made by conducting an antioxidation treatment on Cu or Ni.

It should be noted that, as the metal filler included in the conductive resin layer 34, it is possible to use a metal powder with Sn, Ni, or Cu coated on the surface of the metal powder. Upon using metal powder coated with Sn, Ni, or Cu on the surface of the metal powder, it is preferable to use Ag, Cu, Ni, Sn, or Bi or an alloy powder of these as the metal powder.

The shape of the metal filler included in the conductive resin layer 34 is not particularly limited. The metal filler may be spherical, flat, or the like. In addition, it may be mixing spherical metal powder and flat metal powder.

The average particle size of the metal filler included in the conductive resin layer 34 is not particularly limited. The average particle size of the metal filler, for example, may be on the order of at least about 0.3 μm and no more than about 10.0 μm.

The measurement method of the average particle size of metal filler included in the conductive resin layer 34 can calculate using a laser diffraction particle size measuring method based on ISO 13320 irrespective of the shape of the filler.

The metal filler included in the conductive resin layer 34 mainly accounts for the conductivity of the conductive resin layer 34. More specifically, the energizing path is formed inside of the conductive resin layer 34 by the metal fillers making contact.

The first conductive resin layer 34a includes a first end-surface-side conductive resin layer portion $34a_1$ positioned on the first end surface 12e, and a first adjacent conductive resin layer portion $34a_2$ positioned to extend from an end portion of the first end-surface-side conductive resin layer portion $34a_1$ portion to a portion on the first main surface 12a, a portion on the second main surface 12b, a portion on the first lateral surface 12c and a portion on the second lateral surface 12d. The second conductive resin layer 34b includes a second end-surface-side conductive resin layer portion $34b_1$ positioned on the first end surface 12f, and a second adjacent conductive resin layer portion $34b_2$ positioned to extend from an end portion of the first end-surface-side conductive resin layer portion $34a_1$ portion to a portion on the first main surface 12a, a portion on the second main surface 12b, a portion on the first lateral surface 12c and a portion on the second lateral surface 12d.

The resin amount included in the first adjacent conductive resin layer portion $34a_2$ is greater than the resin amount included in the first end-surface-side conductive resin layer portion $34a_1$, and the resin amount included in the second adjacent conductive resin layer portion $34b_2$ is greater than the resin amount included in the second end-surface-side conductive resin layer portion $34b_1$. In other words, when defining the total amount of resin component and metal component in the first end-surface-side conductive resin layer portion $34a_1$ and the first adjacent conductive resin layer portion $34a_2$ as 100%, the content ratio of resin component included in the first adjacent conductive resin layer portion $34a_2$ is greater than the content ratio of resin component included in the first end-surface-side conductive resin layer portion $34a_1$, and when defining the total amount of resin component and metal component in the second end-surface-side conductive resin layer portion $34b_1$ and the second adjacent conductive resin layer portion $34b_2$ as 100%, the content ratio of resin component included in the second adjacent conductive resin layer portion $34b_2$ is greater than the content ratio of resin component included in the second end-surface-side conductive resin layer portion $34b_1$. It thereby becomes possible to improve the conductivity in the first end-surface-side conductive resin layer portion $34a_1$ and the second end-surface-side conductive resin layer portion $34b_1$ having abundant metal filler, which is the metal component included in the conductive resin layer 34, a result of which it is possible to decrease the ESR of the multilayer ceramic capacitor. On the other hand, in the first adjacent conductive resin layer portion $34a_2$ and the second adjacent conductive resin layer portion $34b_2$, having an abundant amount of resin, since it becomes possible to maintain sufficient elasticity, upon receiving stress from an impact when dropping, or deflective stress occurring by being subjected to thermal cycling and the mounting substrate thermally expanding and contracting being generated, for the stress transmitted to the mounting substrate (distortion of mounting substrate), it is possible for peeling off to occur between the first base electrode layer 32a and first adjacent conductive resin layer portion $34a_2$, or between the first plated layer 36a and first adjacent conductive resin layer portion $34a_2$ with the starting point of the leading end of the first adjacent conductive resin layer portion $34a_2$, and possible to fracture cohesion inside of the first adjacent conductive resin layer portion $34a_2$, and similarly, it is possible for peeling off to occur between the second base electrode layer 32b and second adjacent conductive resin layer portion $34b_2$, or between the second plated layer 36b and second adjacent conductive resin layer portion $34b_2$ with the starting point of the leading end of the second adjacent conductive resin layer portion $34b_2$, and possible to fracture cohesion inside of the second adjacent conductive resin layer portion $34b_2$. As a result, it becomes possible to relieve stress and reduce or prevent cracking in the multilayer body 12, and thus mechanical strength of the multilayer ceramic capacitor 10 can be improved. Based on the above, in the tradeoff relationship in mechanical strength related to the multilayer ceramic capacitor 10, and ESR characteristic, example embodiments of the present invention make it possible to effectively exhibit the characteristics of both of these.

The content ratio of resin component in the first end-surface-side conductive resin layer portion $34a_1$ and the second end-surface-side conductive resin layer portion $34b_1$, when defining the total amount of the resin component and metal component as 100%, is at least about 10% and no more than about 60%, for example. While securing conductivity and reducing ESR in the first end-surface-side conductive resin layer portion $34a_1$ and second end-surface-side conductive resin layer portion $34b_1$, upon receiving stress from an impact when falling, or deflection stress occurring by being subjected to thermal cycling and the mounting substrate thermally expanding and contracting being generated, for the stress transmitted to the mounting substrate (distortion of mounting substrate), it is thereby possible to peel off between the first base electrode layer 32a and first adjacent conductive resin layer portion $34a_2$, or between the first plated layer 36a and first adjacent conductive resin layer portion $34a_2$ with the starting point of the leading end of the first adjacent conductive resin layer portion $34a_2$, and similarly, it is possible for peeling off to occur between the second base electrode layer 32b and second adjacent conductive resin layer portion $34b_2$, or between the second plated layer 36b and second adjacent conductive resin layer portion $34b_2$ with the starting point of the leading end of the second adjacent conductive resin layer portion $34b_2$. It thereby becomes possible to relieve stress, and reduce or prevent cracking in the multilayer body 12.

For the content ratio of the resin component in the first end-surface-side conductive resin layer portion $34a_1$ and the second end-surface-side conductive resin layer portion $34b_1$, when defining the total amount of resin component and metal component as 100%, in the case of being less than about 10%, the ratio of metal component in the first end-surface-side conductive resin layer portion $34a_1$ and the second end-surface-side conductive resin layer portion $34b_1$ increases, and the resin amount that should exist around the metal filler of the metal component decreases. Herein, the conductive resin layer 34 generally causes the metal filler particles to contact, by trying to pull the metal filler particles together by the resin contracting upon curing of the conductive resin layer 34. However, in the case of the content ratio of resin component decreasing as mentioned above, this contraction is small, and it is not possible to make the metal filler particles sufficiently contact, thereby entering a state where voids appear between metal filler particles. For this reason, ESR deteriorates.

In addition, for the content ratio of resin component in the first end-surface-side conductive resin layer portion $34a_1$ and the second end-surface-side conductive resin layer portion $34b_1$, when defining the total amount of resin component and metal component as 100%, in the case of being greater than about 60%, contact between metal fillers of the metal component is hindered by the content ratio of resin component in the first end-surface-side conductive resin layer portion $34a_1$ and the second end-surface-side conductive resin layer portion $34b_1$ increasing, and the distance between metal filler particles lengthens, and thus ESR deteriorates.

The measurement method of the content ratio of resin component in the first end-surface-side conductive resin layer portion $34a_1$ and the second end-surface-side conductive resin layer portion $34b_1$ can be measured in a cross section as shown below. In other words, first, polishing is started from the first lateral surface $12c$ or second lateral surface $12d$ of the multilayer ceramic capacitor 10, and the central portion in the height direction x of the first end-surface-side conductive resin layer portion $34a_1$ on the side of the first end surface $12e$ or the second end-surface-side conductive resin layer portion $34b_1$ on the side of the second end surface $12f$ is confirmed in the LT plane polished to a position that is about ½W in the width direction y linking the first lateral surface $12c$ and second lateral surface $12d$, for example. Alternatively, polishing is started from the first main surface $12a$ or second main surface $12b$ of the multilayer ceramic capacitor 10, and the central portion in the width direction y of the first end-surface-side conductive resin layer portion $34a_1$ on the side of the first end surface $12e$ or the second end-surface-side conductive resin layer portion $34b_1$ on the side of the second end surface $12f$ is confirmed in the LW plane polished to a position that is ½T in the height direction x linking the first main surface $12a$ and second main surface $12b$. Next, using a scanning electron microscope (SEM), the backscattered electron image is observed with an acceleration voltage of about 5 kV and magnification of about 1000 times, and photographed, so that it is possible to distinguish between the thermosetting resin and other components (metal component (metal filler), voids). Afterwards, the photographed image is binarized into the thermosetting resin and other by image analysis software, and it is possible to obtain the content ratio of resin component in the first end-surface-side conductive resin layer portion $34a_1$ and the second end-surface-side conductive resin layer portion $34b_1$.

The content ratio of metal component in the first end-surface-side conductive resin layer portion $34a_1$ and the second end-surface-side conductive resin layer portion $34b_1$, when defining the total amount of resin component and metal component as 100%, is preferably at least about 40% and no more than about 90%. It thereby becomes possible to improve the conductivity in the first end-surface-side conductive resin layer portion $34a_1$ and the second end-surface-side conductive resin layer portion $34b_1$ having abundant metal filler of the metal component, a result of which the ESR of the multilayer ceramic component 10 declines.

For the content ratio of metal component in the first end-surface-side conductive resin layer portion $34a_1$ and the second end-surface-side conductive resin layer portion $34b_1$, when defining the total amount of resin component and metal component as 100%, in the case of being less than about 40%, since contact between metal filler particles of the metal component is hindered by the content ratio of resin component in the first end-surface-side conductive resin layer portion $34a_1$ and the second end-surface-side conductive resin layer portion $34b_1$ increasing, and the distance between metal filler particles lengthening, the ESR may deteriorate.

For the content ratio of the first end-surface-side conductive resin layer portion $34a_1$ and the second end-surface-side conductive resin layer portion $34b_1$, when defining the total amount of resin component and metal component as 100%, in the case of being greater than about 90%, the ratio of metal component in the first end-surface-side conductive resin layer portion $34a_1$ and the second end-surface-side conductive resin layer portion $34b_1$ increases, and the resin amount which should be present around the metal filler of the metal component decreases. Herein, the conductive resin layer 34 generally causes the metal filler particles to contact, by trying to pull the metal filler particles by the resin contracting upon curing of the conductive resin layer 34. However, in the case of the content ratio of resin component decreasing as mentioned above, this contraction is small, and it is not possible to make the metal filler particles sufficiently contact, thereby entering a state where voids appear between metal filler particles. For this reason, ESR deteriorates.

The measurement method of the content ratio of metal component in the first end-surface-side conductive resin layer portion $34a_1$ and the second end-surface-side conductive resin layer portion $34b_1$ can measure in a cross section, as shown below. In other words, first, polishing is started from the first lateral surface $12c$ or second lateral surface $12d$ of the multilayer ceramic capacitor 10, and the central portion in the height direction x of the first end-surface-side conductive resin layer portion $34a_1$ on the side of the first end surface $12e$ or the second end-surface-side conductive resin layer portion $34b_1$ on the side of the second end surface $12f$ is confirmed in the LT plane polished to a position that is ½W in the width direction y linking the first lateral surface $12c$ and second lateral surface $12d$. Alternatively, polishing is started from the first main surface $12a$ or second main surface $12b$ of the multilayer ceramic capacitor 10, and the central portion in the width direction y of the first end-surface-side conductive resin layer portion $34a_1$ on the side of the first end surface $12e$ or the second end-surface-side conductive resin layer portion $34b_1$ on the side of the second end surface $12f$ is confirmed in the LW plane polished to a position that is ½T in the height direction x linking the first main surface $12a$ and second main surface $12b$. Next, using a scanning electron microscope (SEM), the backscattered electron image is observed with an acceleration voltage of about 5 kV and magnification of about 1000 times, and photographed, so that it is possible to distinguish between the thermosetting resin and other components (metal component (metal filler), voids). Afterwards, the photographed image is binarized into the thermosetting resin and other by image analysis software, and it is possible to obtain the content ratio of metal component in the first end-surface-side conductive resin layer portion $34a_1$ and the second end-surface-side conductive resin layer portion $34b_1$.

The content ratio of resin component in the first adjacent conductive resin layer portion $34a_2$ and the second adjacent conductive resin layer portion $34b_2$, when defining the total amount of resin component and metal component as 100%, is preferably at least about 40% and no more than about 60%, for example. At the arranged portion of the first adjacent conductive resin layer portion $34a_2$ and second adjacent conductive resin layer portion $34b_2$ at which stress tends to act, since it is thereby possible to impart sufficient elasticity, upon stress due to impact when falling, or deflection stress generated by being subjected to thermal cycling and the mounting substrate thermally expanding being generated, for the stress transmitted to the mounting substrate (mounting substrate distortion), it is possible for peeling off to occur between the first base electrode layer $32a$ and first adjacent conductive resin layer portion $34a_2$, or between the first plated layer $36a$ and first adjacent conductive resin layer portion $34a_2$ with the starting point of the leading end of the arranged portion of the first adjacent conductive resin layer portion $34a_2$, and similarly, it is possible for peeling off to occur between the second base electrode layer $32b$ and second adjacent conductive resin layer portion $34b_2$, or between the second plated layer $36b$ and second adjacent conductive resin layer portion $34b_2$ with the starting point of the leading end of the arranged portion of the second adjacent conductive resin layer portion $34b_2$. As a result, it thereby becomes possible to relieve stress and reduce or prevent cracking in the multilayer body 12, and thus mechanical strength of the multilayer ceramic capacitor 10 is improved.

For the content ratio of resin component in the first adjacent conductive resin layer portion $34a_2$ and the second adjacent conductive resin layer portion $34b_2$, when defining the total amount of resin component and metal component as 100%, in the case of being smaller than about 40%, the content ratio of metal component in the first adjacent conductive resin layer portion $34a_2$ and the second adjacent conductive resin layer portion $34b_2$ increases. Herein, when comparing the elastic modulus and hardness between the metal filler of the metal component and the resin, the metal filler comes to have a higher value. For this reason, by the ratio of metal filler included in the first adjacent conductive resin layer portion $34a_2$ and second adjacent conductive resin layer portion $34b_2$ becoming higher, the entire portion of the conductive resin layer 34 hardens, and even in the case of stress from impact when dropping, or deflective stress occurring by being subjected to thermal cycling and the mounting substrate thermally expanding and contracting being generated, for the stress transmitted to the mounting substrate (distortion of mounting substrate), it will not be possible to peel off between the first base electrode layer $32a$ and first adjacent conductive resin layer portion $34a_2$, or between the first plated layer $36a$ and first adjacent conductive resin layer portion $34a_2$, with the starting point of the leading end of the arranged portion of the first adjacent conductive resin layer portion $34a_2$, and similarly, it will not be possible to peel off between the second base electrode layer $32b$ and second adjacent conductive resin layer portion $34b_2$, or between the second plated layer $36b$ and second adjacent conductive resin layer portion $34b_2$ with the starting point of the leading end of the arranged portion of the second adjacent conductive resin layer portion $34b_2$. Therefore, there may be cracking in the multilayer body 12.

For the content ratio of resin component in the first adjacent conductive resin layer portion $34a_2$ and the second adjacent conductive resin layer portion $34b_2$, when defining the total amount of resin component and metal component as 100%, in the case of being greater than about 90%, since the resin amount in the first adjacent conductive resin layer portion $34a_2$ and the second adjacent conductive resin layer portion $34b_2$ increases, the metal filler exposed at the surface of the first adjacent conductive resin layer portion $34a_2$ and the second adjacent conductive resin layer portion $34b_2$ decreases. In the case of the metal filler exposed at the surface of the first adjacent conductive resin layer portion $34a_2$ and the second adjacent conductive resin layer portion $34b_2$ decreasing, since the starting point of growth of plating of the plated layer 36 formed at the surface of the first adjacent conductive resin layer portion $34a_2$ and the second adjacent conductive resin layer portion $34b_2$ decreases, plating formation is hindered. When plating formation is hindered, a portion without plating formation occurs, and thus makes a plated layer in which several defective portions exist discontinuously. Since the stress tends to concentrate at the several defective portions, upon receiving stress from an impact when dropping, or deflective stress occurring by being subjected to thermal cycling and the mounting substrate thermally expanding and contracting being generated, stress also comes to act at the defective portions, and it is not possible to achieve sufficient peeling off between the first base electrode layer $32a$ and first adjacent conductive resin layer portion $34a_2$, or between the first plated layer $36a$ and first adjacent conductive resin layer portion $34a_2$, starting at the leading end of the first adjacent conductive resin layer portion $34a_2$ and second adjacent conductive resin layer portion $34b_2$, and similarly it is not possible to achieve peeling off between the second base electrode layer $32b$ and second adjacent conductive resin layer portion $34b_2$, or between the second plated layer $36b$ and second adjacent conductive resin layer portion $34b_2$, starting at the leading end of the arranged portion of the second adjacent conductive resin layer portion $34b_2$. Therefore, there may be cracking in the multilayer body 12.

The measurement method of the content ratio of resin component in the first adjacent conductive resin layer portion $34a_2$ and the second adjacent conductive resin layer portion $34b_2$ can measure in a cross section, as shown below. In other words, first, polishing is started from the first lateral surface $12c$ or second lateral surface $12d$ of the multilayer ceramic capacitor 10, and the central portion in the length direction z of the first adjacent conductive resin layer portion $34a_2$ on the first main surface $12a$ side or second main surface $12b$ side, or the second adjacent conductive resin layer portion $34b_2$ on the first main surface $12a$ side or second main surface $12b$ side is confirmed in the LT plane polished to a position which is about ½W in the width direction y linking the first lateral surface $12c$ and second lateral surface $12d$. Alternatively, polishing is started from the first main surface $12a$ or second main surface $12b$ of the multilayer ceramic capacitor 10, and the central portion in the length direction z of the first adjacent conductive resin layer portion $34a_2$ on the first lateral surface $12c$ side or second lateral surface $12d$ side, or the second adjacent conductive resin layer portion $34b_2$ on the first lateral surface $12c$ side or second lateral surface $12d$ side is confirmed, in the LW plane polished to a position which is about ½T in the height direction x linking the first main surface $12a$ and second main surface $12b$. Next, using a scanning electron microscope (SEM), the backscattered electron image is observed with an acceleration voltage of about 5 kV and magnification of about 1000 times, and photographed, so that it is possible to distinguish between the thermosetting resin and other components (metal component (metal filler), voids). Afterwards, the photographed image is binarized into the thermosetting resin and other by image analysis software, and it is possible to obtain the content ratio of resin component in the first adjacent conductive resin layer portion $34a_2$ and the second adjacent conductive resin layer portion $34b_2$.

The content ratio of metal component in the first adjacent conductive resin layer portion $34a_2$ and the second adjacent conductive resin layer portion $34b_2$, when defining the total amount of the resin component and metal components as 100%, is preferably at least about 10% and no more than about 60%, for example. It is thereby possible to secure conduction, and upon receiving stress from an impact when dropping, or deflective stress occurring by being subjected to thermal cycling and the mounting substrate thermally expanding and contracting being generated, for the stress transmitted to the mounting substrate (distortion of mounting substrate), it is possible for peeling off to occur between the first base electrode layer $32a$ and first adjacent conductive resin layer portion $34a_2$, or between the first plated layer $36a$ and first adjacent conductive resin layer portion $34a_2$ with the starting point of the leading end of the arranged portion of the first adjacent conductive resin layer portion $34a_2$, and similarly, it is possible for peeling off to occur between the second base electrode layer $32b$ and second adjacent conductive resin layer portion $34b_2$, or between the second plated layer $36b$ and second adjacent conductive resin layer portion $34b_2$ with the starting point of the leading end of the arranged portion of the second adjacent conductive resin layer portion $34b_2$. As a result thereof, it is possible to relieve stress acting on the multilayer body 12, by the first adjacent conductive resin layer portion $34a_2$ and the second adjacent conductive resin layer portion $34b_2$ being formed.

For the content ratio of the metal component in the first adjacent conductive resin layer portion $34a_2$ and the second adjacent conductive resin layer portion $34b_2$, when defining the total amount of the resin component and metal component as 100%, in the case of being smaller than about 10%, since the resin amount in the first adjacent conductive resin layer portion $34a_2$ and the second adjacent conductive resin layer portion $34b_2$ increases, the metal filler exposed at the surface of the first adjacent conductive resin layer portion $34a_2$ and the second adjacent conductive resin layer portion $34b_2$ decreases. In the case of the metal filler exposed at the surface of the first adjacent conductive resin layer portion $34a_2$ and the second adjacent conductive resin layer portion $34b_2$ decreasing, since the starting point of growth of plating of the plated layer 36 formed at the surface of the first adjacent conductive resin layer portion $34a_2$ and the second adjacent conductive resin layer portion $34b_2$ decreases, the plating formation is hindered. When plating formation is hindered, a portion without plating formation occurs, and thus makes a plated layer in which several defective portions exist discontinuously. Since the stress tends to concentrate at the several defective portions, upon receiving stress from an impact when dropping, or deflective stress occurring by being subjected to thermal cycling and the mounting substrate thermally expanding and contracting being generated, stress also comes to act at the defective portions, and it is not possible to achieve sufficient peeling off between the first base electrode layer $32a$ and first adjacent conductive resin layer portion $34a_2$, or between the first plated layer $36a$ and first adjacent conductive resin layer portion $34a_2$, starting at the leading end of the first adjacent conductive resin layer portion $34a_2$ and second adjacent conductive resin layer portion $34b_2$, and similarly, it is not possible to achieve peeling off between the second base electrode layer $32b$ and second adjacent conductive resin layer portion $34b_2$, or between the second plated layer $36b$ and second adjacent conductive resin layer portion $34b_2$, starting at the leading end of the arranged portion of the second adjacent conductive resin layer portion $34b_2$. Therefore, there may be cracking in the multilayer body 12.

For the content ratio of the metal component in the first adjacent conductive resin layer portion $34a_2$ and the second adjacent conductive resin layer portion $34b_2$, when defining the total amount of the resin component and metal component as 100%, in the case of being greater than about 60%, the content ratio of the metal component in the first adjacent conductive resin layer portion $34a_2$ and the second adjacent conductive resin layer portion $34b_2$ increases. Herein, when comparing the elastic modulus and hardness between the metal filler of the metal component and the resin, the metal filler comes to have a higher value. For this reason, by the ratio of metal filler included in the first adjacent conductive resin layer portion $34a_2$ and second adjacent conductive resin layer portion $34b_2$ becoming higher, the entire portion of the conductive resin layer 34 hardens, and even in the case of stress from impact when dropping, or deflective stress occurring by being subjected to thermal cycling and the mounting substrate thermally expanding and contracting being generated, for the stress transmitted to the mounting substrate (distortion of mounting substrate), it is not possible to achieve peeling off between the first base electrode layer $32a$ and first adjacent conductive resin layer portion $34a_2$, or between the first plated layer $36a$ and first adjacent conductive resin layer portion $34a_2$ with the starting point of the leading end of the arranged portion of the first adjacent conductive resin layer portion $34a_2$, and similarly, it is not possible to achieve peeling off between the second base electrode layer $32b$ and second adjacent conductive resin layer portion $34b_2$, or between the second plated layer $36b$ and second adjacent conductive resin layer portion $34b_2$ with the starting point of the leading end of the arranged portion of the second adjacent conductive resin layer portion $34b_2$. Therefore, there may be cracking in the multilayer body 12.

The measurement method of the content ratio of the metal component in the first adjacent conductive resin layer portion $34a_2$ and the second adjacent conductive resin layer portion $34b_2$ can measure in a cross section, as shown below. In other words, first, polishing is started from the first lateral surface $12c$ or second lateral surface $12d$ of the multilayer ceramic capacitor 10, and the central portion in the height direction x of the first adjacent conductive resin layer portion $34a_2$ on the first main surface $12a$ side or second main surface $12b$ side, or the second adjacent conductive resin layer portion $34b_2$ on the first main surface $12a$ side or second main surface $12b$ side is confirmed in the LT plane polished to a position which is about ½W in the width direction y linking the first lateral surface $12c$ and second lateral surface $12d$. Alternatively, polishing is started from the first main surface $12a$ or second main surface $12b$ of the multilayer ceramic capacitor 10, and the central portion in the length direction z of the first adjacent conductive resin layer portion $34a_2$ on the first lateral surface $12c$ side or second lateral surface $12d$ side, or the second adjacent conductive resin layer portion $34b_2$ on the first lateral surface $12c$ side or second lateral surface $12d$ side is confirmed, in the LW plane polished to a position which is about ½T in the height direction x linking the first main surface $12a$ and second main surface $12b$. Next, using a scanning electron microscope (SEM), the backscattered electron image is observed with an acceleration voltage of about 5 kV and magnification of about 1000 times, and photographed, so that it is possible to distinguish between the thermosetting resin and other components (metal component (metal filler), voids). Afterwards, the photographed image is binarized into the thermosetting resin and other by image analysis software, and it is possible to obtain the content ratio of metal component in the first adjacent conductive resin layer portion $34a_2$ and the second adjacent conductive resin layer portion $34b_2$.

The thickness in the conductive resin layer 34 positioned at a central portion in the height direction x of the multilayer body 12 located at the first end surface 12e and second end surface 12f, for example, is preferably on the order of at least about 20.0 μm and no more than about 150.0 μm.

In addition, in the case of providing the conductive resin layer also on the first main surface 12a and second main surface 12b, and first lateral surface 12c and second lateral surface 12d, the thickness of the conductive resin layer 34 at a central portion in the length direction z of the conductive resin layer positioned at the first main surface 12a and second main surface 12b, and first lateral surface 12c and second lateral surface 12d, for example, is preferably on the order of at least about 5.0 μm and no more than about 40.0 μm.

The conductivity (resistance) in the first end-surface-side conductive resin layer portion $34a_1$ and the second end-surface-side conductive resin layer portion $34b_1$ is preferably at least about 5 Ω·cm and no more than about 25 Ω·cm, and the conductivity (resistance) in the first adjacent conductive resin layer portion $34a_2$ and the second adjacent conductive resin layer portion $34b_2$ is preferably at least about 20 Ω·cm and no more than about 150 Ω·cm, for example. It is thereby possible to decrease the ESR of the multilayer ceramic capacitor 10.

The indentation elastic modulus of the first end-surface-side conductive resin layer portion $34a_1$ and the second end-surface-side conductive resin layer portion $34b_1$ is preferably at least about 15 GPa and no more than about 21 GPa, and the indentation elastic modulus of the first adjacent conductive resin layer portion $34a_2$ and the second adjacent conductive resin layer portion $34b_2$ is preferably at least about 12 GPa and no more than about 15 GPa, for example. It is thereby possible to relieve the stress on the multilayer body 12, whereby it becomes possible to reduce or prevent cracking in the multilayer body 12, and possible to improve the mechanical strength of the multilayer ceramic capacitor 10.

The storage modulus of the first adjacent conductive resin layer portion $34a_2$ and the second adjacent conductive resin layer portion $34b_2$ is preferably at least about 6 GPa and no more than about 8 GPa, and the storage modulus of the first end-surface-side conductive resin layer portion $34a_1$ and the second end-surface-side conductive resin layer portion $34b_1$ is preferably at least about 8 GPa and no more than about 10 GPa, for example. It is thereby possible to relieve the stress on the multilayer body 12, whereby it becomes possible to reduce or prevent cracking in the multilayer body 12, and possible to improve the mechanical strength of the multilayer ceramic capacitor 10.

The loss modulus of the first adjacent conductive resin layer portion $34a_2$ and the second adjacent conductive resin layer portion $34b_2$ is preferably at least about 0.2 GPa and no more than about 0.4 GPa, and the loss modulus of the first end-surface-side conductive resin layer portion $34a_1$ and the second end-surface-side conductive resin layer portion $34b_1$ is preferably at least about 0.4 GPa and no more than about 0.5 GPa, for example. It is thereby possible to relieve the stress on the multilayer body 12, whereby it becomes possible to reduce or prevent cracking in the multilayer body 12, and possible to improve the mechanical strength of the multilayer ceramic capacitor 10.

The hardness of the first adjacent conductive resin layer portion $34a_2$ and the second adjacent conductive resin layer portion $34b_2$ is preferably at least about 0.1 GPa and no more than about 0.3 GPa, and the hardness of the first end-surface-side conductive resin layer portion $34a_1$ and the second end-surface-side conductive resin layer portion $34b_1$ is preferably at least about 0.2 GPa and no more than about 0.7 GPa, for example. It is thereby possible to relieve the stress on the multilayer body 12, whereby it becomes possible to reduce or prevent cracking in the multilayer body 12, and possible to improve the mechanical strength of the multilayer ceramic capacitor 10.

Next, the first plated layer 36a and second plated layer 36b, which are the plated layers 36 provided on the base electrode layer 32, will be explained by referencing FIGS. 2 and 3. The first plated layer 36a and second plated layer 36b, for example, include at least one of Cu, Ni, Sn, Ag, Pd, Ag—Pd alloy, Au or the like.

The first plated layer 36a is arranged so as to completely cover the first conductive resin layer 34a. The second plated layer 36b is arranged so as to completely cover the second conductive resin layer 34b.

The first plated layer 36a and second plated layer 36b may be including a plurality of layers. In this case, the plated layer 36 is preferably a two-layer structure of a lower plated layer (Ni plated layer) from Ni plating provided on the conductive resin layer 34, and an upper plated layer (Sn plated layer) from Sn plating provided on the first lower plated layer. In other words, the first plated layer 36a includes a first lower plated layer, and a first upper plated layer positioned on the surface of the lower plated layer. In addition, the second plated layer 36b includes a second lower plated layer, and a second upper plated layer positioned on the surface of the second lower plated layer.

The lower plated layer made from Ni plating is used to prevent the base electrode layer 32 or conductive resin layer 34 from being eroded by solder upon mounting to the multilayer ceramic capacitor 10, and the upper plated layer made from Sn plating is used to be able to be easily mounted by improving the wettability of solder upon mounting the multilayer ceramic capacitor 10. The thickness per layer of plated layer is preferably at least about 1.0 μm and no more than about 15.0 μm, for example.

The dimension in the length direction z of the multilayer ceramic capacitor 10 including the multilayer body 12, first external electrode 30a and second external electrode 30b is defined as the L dimension, the dimension in the height direction x of the multilayer ceramic capacitor 10 including the multilayer body 12, first external electrode 30a and second external electrode 30b is defined as the T dimension, and the dimension in the width direction y of the multilayer ceramic capacitor 10 including the multilayer body 12, first external electrode 30a and second external electrode 30b is defined as the W dimension. For the dimensions of the multilayer ceramic capacitor 10, the L dimension in the length direction is at least about 0.2 mm and no more than about 10.0 mm, the W dimension in the width direction y is at least about 0.1 mm and no more than about 10.0 mm, and the T dimension in the height direction x is at least about 0.1 mm and no more than about 10.0 mm, for example. In addition, the dimensions of the multilayer ceramic capacitor 10 can be measured by a microscope.

For the multilayer ceramic capacitor 10 shown in FIG. 1, when defining the total amount of resin component and metal component in the first end-surface-side conductive resin layer portion $34a_1$ and the first adjacent conductive resin layer portion $34a_2$ as 100%, the content ratio of resin component included in the first adjacent conductive resin layer portion $34a_2$ is greater than the content ratio of resin component included in the first end-surface-side conductive resin layer portion $34a_1$, and when defining the total amount of resin component and metal component in the second end-surface-side conductive resin layer portion $34b_1$ and the second adjacent conductive resin layer portion $34b_2$ as 100%, the content ratio of resin component included in the second adjacent conductive resin layer portion $34b_2$ is greater than the content ratio of resin component included in the second end-surface-side conductive resin layer portion $34b_1$. The content ratio of resin component in the first end-surface-side conductive resin layer portion $34a_1$ and the first adjacent conductive resin layer portion $34a_2$, when defining the total amount of the resin component and metal component as 100%, is at least about 10% and no more than about 60%, for example. The content ratio of the resin component in the first end-surface-side conductive resin layer portion $34a_1$ and the second end-surface-side conductive resin layer portion $34b_1$ having abundant metal filler, which is the metal component included in the conductive resin layer 34, when defining the total amount of the resin component and metal component as 100%, is at least about 10% and no more than about 60%, for example. Therefore, it becomes possible to improve conductivity, a result of which the ESR of the multilayer ceramic capacitor can be decreased. On the other hand, in the first adjacent conductive resin layer portion $34a_2$ and the second adjacent conductive resin layer portion $34b_2$ having an abundant amount of resin, since it becomes possible to maintain sufficient elasticity, upon receiving stress from an impact when dropping, or deflective stress occurring by being subjected to thermal cycling and the mounting substrate thermally expanding and contracting being generated, for the stress transmitted to the mounting substrate (distortion of mounting substrate), it is possible for peeling off to occur between the first base electrode layer 32a and first adjacent conductive resin layer portion $34a_2$, or between the first plated layer 36a and first adjacent conductive resin layer portion $34a_2$ with the starting point of the leading end of the first adjacent conductive resin layer portion $34a_2$, and possible to fracture cohesion inside of the first adjacent conductive resin layer portion $34a_2$, and similarly, it is possible for peeling off to occur between the second base electrode layer 32b and second adjacent conductive resin layer portion $34b_2$, or between the second plated layer 36b and second adjacent conductive resin layer portion $34b_2$ with the starting point of the leading end of the second adjacent conductive resin layer portion $34b_2$, and possible to fracture cohesion inside of the second adjacent conductive resin layer portion $34b_2$. As a result, it becomes possible to relieve stress and reduce or prevent cracking in the multilayer body 12, and thus mechanical strength of the multilayer ceramic capacitor 10 can be improved. Based on the above, in the tradeoff relationship in mechanical strength related to the multilayer ceramic capacitor 10, and ESR characteristic, the present invention makes it possible to effectively exhibit the characteristics of both of these.

2. Production Method of Multilayer Ceramic Capacitor

Next, an example of a production method of the multilayer ceramic capacitor will be explained.

First, a dielectric sheet for the ceramic layer and a conductive paste for the internal electrode layer are prepared. The dielectric sheet and the conductive paste for the internal electrode layer include binder and solvent. The binder and solvent may be known ones.

Then, the dielectric paste for the internal electrode layer, for example, is printed in a predetermined pattern on the dielectric sheet, by screen printing, gravure printing or the like. The dielectric sheet on which a pattern of the first internal electrode layer was formed, and the dielectric sheet on which a pattern of the second internal electrode layer was formed are thereby prepared.

In addition, concerning the dielectric sheets, a dielectric sheet for an external layer on which a pattern of the internal electrode layer has not been printed is also prepared.

Next, by the dielectric sheet for an external layer on which a pattern of the internal electrode layer has not been printed being laminated in a predetermined number, a portion serving as a second outer layer portion on the second main surface side is formed. Then, a portion serving as the effective layer portion is formed by the dielectric sheet on which a pattern of the first internal electrode layer was printed, and a dielectric sheet on which a pattern of the second internal electrode layer was printed being laminated in order on a portion serving as the second outer layer portion so as to make the structure of the present invention. A portion serving as the first outer layer portion on the first main surface side is formed by a dielectric sheet for the outer layer on which a pattern of the internal electrode layer is not printed being laminated in a predetermined number on this portion serving as the effective layer portion.

Next, a multilayer block is manufactured by the multilayer sheet being pressed in the lamination direction via hydrostatic pressing or other methods.

Then, a multilayer chip is cut out by the multilayer block being cut to a predetermined size. At this time, corners and ridges of the multilayer chip may be rounded by barrel polishing or the like.

Next, the multilayer body 12 is manufactured by the multilayer chip being fired. The firing temperature depends on the materials of the ceramic layer which is a dielectric, and the internal electrode layer. However, it is preferably at least about 900° C. and no more than about 1400° C., for example.

Next, a conductive paste serving as the base electrode layer is coated on the first end surface and second end surface of the multilayer body to form the base electrode layer. In the case of forming a fired layer as the base electrode layer, a conductive paste including a glass component and metal is coated by a method such as dipping, for example, and then firing treatment is performed, whereby the base electrode layer is formed. The temperature of the firing treatment at this time is preferably at least about 700° C. and no more than about 950° C., for example.

In addition, in the case of forming the base electrode layer by a fired layer, the fired layer may include a ceramic component. In this case, a ceramic component may be included in place of the glass component, or may include both.

The ceramic component is preferably the same type of ceramic material as the multilayer body, for example. It should be noted that, in the case of including a ceramic component in the fired layer, it is preferable to coat the conductive paste on the multilayer chip before firing, simultaneously fire the multilayer chip before firing and the conductive paste coated on the multilayer chip before firing (baking), to form a multilayer body on which the fired layer is formed. The temperature of the firing treatment at this time (firing temperature) is preferably at least about 900° C. and no more than about 1400° C., for example.

Next, the conductive resin layer is provided on the base electrode layer. At this time, the end-surface-side conductive resin layer portion and adjacent conductive resin layer portion are formed by separately coating.

The formation of the end-surface-side conductive resin layer portion is performed by the following method. First, the multilayer body is provided on the back row plate with the first end surface side or second end surface side facing upwards, and the first conductive resin paste for the end-surface-side conductive resin layer portion is coated only onto a portion on which it is desired to form the end-surface-side conductive resin layer portion. The amount of metal filler included in the first conductive resin paste is preferably included in at least about 35 vol % and no more than about 95 vol % relative to the resin component, for example. In addition, the amount of the resin component included in the first conductive resin paste is preferably included in at least about 5 vol % and no more than about 65 vol % relative to the metal filler, for example. Afterwards, heat treatment at a temperature of at least about 200° C. and no more than about 550° C., for example, is performed to cure the first conductive resin paste. The atmosphere during heat treatment at this time is preferably an $N_2$ atmosphere. In addition, to prevent scattering of resin and prevent oxidation of various metal components, the oxygen concentration preferably is curbed to no more than about 100 ppm, for example.

Next, the formation of the adjacent conductive resin layer portion is performed by the following method. First, the multilayer body is aligned on the arrangement plate with the first main surface side, second main surface side, first lateral surface side and second lateral surface side respective facing upwards, masking is performed so that the second conductive resin paste for the adjacent conductive resin layer can be coated on only a portion on which it is desired to the form the second conductive resin paste for the adjacent conductive resin layer portion, and the second conductive resin paste for the adjacent conductive resin layer portion is coated using a screen printing method. The amount of metal filler included in the second conductive resin paste is preferably included in at least about 5 vol % and no more than about 65 vol % relative to the resin component, for example. In addition, the amount of resin component included in the second conductive resin paste is preferably included in at least about 50 vol % and no more than about 95 vol % relative to the metal filler, for example. Afterwards, heat treatment is performed at a temperature of at least about 200° C. and no more than about 550° C. to cure the second conductive resin paste, for example. The atmosphere during heat treatment at this time is preferably an $N_2$ atmosphere. In addition, to prevent scattering of resin and prevent oxidation of various metal components, the oxygen concentration preferably is curbed to no more than about 100 ppm, for example.

It should be noted that, with example embodiments of the present invention, by adjusting the temperature of heat treatment of the end-surface-side conductive resin layer portion or adjacent conductive resin layer portion, or the amount of metal filler or resin amount included in the first conductive resin paste and second conductive resin paste used upon forming the end-surface-side conductive resin layer portion and adjacent conductive resin layer portion, it is possible to control the metal filler and resin amount of the end-surface-side conductive resin layer portion and adjacent conductive resin layer portion.

Next, the plated layer is provided on the surface of the base electrode layer. In more detail, the Ni plated layer is formed on the base electrode layer, and the Sn plated layer is formed on the Ni plated layer. Upon performing the plating process, electroless plating is adopted. Since the conductive resin layer has little content of metal component, conduction is difficult. For this reason, the plated layer is formed by electroless plating. As the plating method, it is preferable to use barrel plating.

By configuring in the above way, the multilayer ceramic capacitor 10 according to the present example embodiment is produced.

3. Test Example 1

Following the aforementioned production method, a multilayer ceramic capacitor to be a sample was prepared as a multilayer ceramic electronic component, and ESR measurement and evaluation was performed by confirming the presence/absence of cracks in the multilayer body by a substrate bending test.

(a) Specifications of Samples of Examples

As Examples, the sample structures shown in FIGS. 1 to 4 were established to prepare multilayer ceramic capacitors of the following specification.

Dimensions of multilayer ceramic capacitor (design value): L×W×T=3.2 mm×2.5 mm×2.5 mm Material of main component of ceramic layer: $BaTiO_3$ Capacitance: 1 nF Rated voltage: 50 V Material of internal electrode layer: Ni Specification of external electrode layer Specification of base electrode layer Base electrode layer: fired layer including metal component and glass component Metal component: Cu Thickness of Base Electrode Layer Thickness in length direction z at central portion in height direction x of base electrode layer positioned at first end surface and second end surface in cross section of multilayer body at ½W position: 30 μm Thickness in height direction x linking first main surface and second main surface at central portion in length direction z of base electrode layer positioned at first main surface and second main surface in cross section of multilayer body at ½W position (thickness of base electrode layer at e dimension central portion): 5 μm Thickness in width direction y linking first lateral surface and second lateral surface at central portion in length direction z of base electrode layer positioned at first lateral surface and second lateral surface in cross section of multilayer body at ½T position (thickness of base electrode layer at e dimension central portion): 5 μm Specification of Conductive Resin Layer End-surface-side conductive resin layer portion: metal filler: Ag Resin component: epoxy based Thermosetting temperature: 230° C.

Thickness in length direction z at central portion in height direction x of end-surface-side conductive resin layer portion located at first end surface and second end surface in cross section of multilayer body at ½W position: 30 μm Ratio of content of each of metal filler and resin amount: metal filler:resin=70:30

Adjacent conductive resin layer portion: metal filler: Ag

Resin component: epoxy based

Thermosetting temperature: 230° C.

Thickness in length direction z of central portion in heigh direction x of end-surface-side conductive resin layer portion located at first end surface and second end surface in cross section of multilayer body at ½W position: 10 μm Ratio of content of each of metal filler and resin amount: metal filler:resin=40:60

Specification of plated layer: formed in two layers, forming Ni plated layer on base electrode layer and Sn plated layer on Ni plated layer Thickness of Ni Plated Layer Thickness in length direction z of central portion in height direction x of Ni plated layer located at first end surface and second end surface in cross section of multilayer body at ½W position: 3 μm Thickness at central portion in length direction z of Ni plated layer located on first main surface and second main surface, and on first lateral surface and second lateral surface: 3 μm Thickness of Sn Plated Layer Thickness in length direction z at central portion in height direction x of Ni plated layer located at first end surface and second end surface in cross section of multilayer body at ½W position: 4 μm Thickness at central portion in length direction z of Ni plated layer located on first main surface and second main surface, and first lateral surface and second lateral surface: 4 μm (b) Specifications of Sample of Comparative Example 1

A multilayer ceramic capacitor of the following specifications was prepared as Comparative Example 1. In other words, the multilayer ceramic capacitor of Comparative Example 1 establishes a resin amount included in the end-surface-side conductive resin layer portion as about 60 vol %, and establishes the resin amount included in the adjacent conductive resin layer portion as about 60 vol %. Other specifications thereof are as follows.

Dimensions of multilayer ceramic capacitor (design value): L×W×T=3.2 mm×2.5 mm×2.5 mm Material of main component of ceramic layer: BaTiO₃

Capacitance: 1 nF

Rated voltage: 50 V

Material of internal electrode layer: Ni

Specification of External Electrode Layer

Specification of Base Electrode Layer

Base electrode layer: fired layer including metal component and glass component

Metal component: Cu

Thickness of Base Electrode Layer

Thickness in length direction z at central portion in height direction x of base electrode layer positioned at first end surface and second end surface in cross section of multilayer body at ½W position: 30 μm Thickness in height direction x linking first main surface and second main surface at central portion in length direction z of base electrode layer positioned at first main surface and second main surface in cross section of multilayer body at ½W position (thickness of base electrode layer at e dimension central portion): 5 μm Thickness in width direction y linking first lateral surface and second lateral surface at central portion in length direction z of base electrode layer positioned at first lateral surface and second lateral surface in cross section of multilayer body at ½T position (thickness of base electrode layer at e dimension central portion): 5 μm Specification of Conductive Resin Layer End-surface-side conductive resin layer portion: metal filler: Ag Resin component: epoxy based Thermosetting temperature: 230° C.

Thickness in length direction z at central portion in heigh direction x of end-surface-side conductive resin layer portion located at first end surface and second end surface in cross section of multilayer body at ½W position: 30 μm Ratio of content of each of metal filler and resin amount:metal filler:resin=40:60

Adjacent conductive resin layer portion: metal filler: Ag Resin component: epoxy based Thermosetting temperature: 230° C.

Thickness in length direction z at central portion in heigh direction x of end-surface-side conductive resin layer portion located at first end surface and second end surface in cross section of multilayer body at ½W position: 10 μm Ratio of content of each of metal filler and resin amount:metal filler:resin=40:60

Specification of plated layer: formed in two layers, forming Ni plated layer on base electrode layer and Sn plated layer on Ni plated layer Thickness of Ni Plated Layer Thickness in length direction z of central portion in height direction x of Ni plated layer located at first end surface and second end surface in cross section of multilayer body at ½W position: 3 μm Thickness at central portion in length direction z of Ni plated layer located on first main surface and second main surface, and on first lateral surface and second lateral surface: 3 μm Thickness of Sn Plated Layer Thickness in length direction z at central portion in height direction x of Ni plated layer located at first end surface and second end surface in cross section of multilayer body at ½W position: 4 μm Thickness at central portion in length direction z of Ni plated layer located on first main surface and second main surface, and first lateral surface and second lateral surface: 4 μm (c) Specifications of Sample of Comparative Example 2

A multilayer ceramic capacitor of the following specifications was prepared as Comparative Example 2. A multilayer ceramic capacitor of the following specifications was prepared as Comparative Example 2. In other words, the multilayer ceramic capacitor of Comparative Example 1 establishes a resin amount included in the end-surface-side conductive resin layer portion as 60 vol %, and establishes the resin amount included in the adjacent conductive resin layer portion as 30 vol %. Other specifications thereof are as follows.

Dimensions of multilayer ceramic capacitor (design value): L×W×T=3.2 mm×2.5 mm×2.5 mm Material of main component of ceramic layer: BaTiO₃

Capacitance: 1 nF
Rated voltage: 50 V
Material of internal electrode layer: Ni
Specification of External Electrode Layer
Specification of Base Electrode Layer
  Base electrode layer: fired layer including metal component and glass component
  Metal component: Cu
Thickness of Base Electrode Layer
  Thickness in length direction z at central portion in height direction x of base electrode layer positioned at first end surface and second end surface in cross section of multilayer body at ½W position: 30 μm
  Thickness in height direction x linking first main surface and second main surface at central portion in length direction z of base electrode layer positioned at first main surface and second main surface in cross section of multilayer body at ½W position (thickness of base electrode layer at e dimension central portion): 5 μm
  Thickness in width direction y linking first lateral surface and second lateral surface at central portion in length direction z of base electrode layer positioned at first lateral surface and second lateral surface in cross section of multilayer body at ½T position (thickness of base electrode layer at e dimension central portion): 5 μm
Specification of Conductive Resin Layer
  End-surface-side conductive resin layer portion: metal filler: Ag
  Resin component: epoxy based
  Thermosetting temperature: 230° C.
  Thickness in length direction z at central portion in heigh direction x of end-surface-side conductive resin layer portion located at first end surface and second end surface in cross section of multilayer body at ½W position: 30 μm
  Ratio of content of each of metal filler and resin amount: metal filler:resin=40:60
  Adjacent conductive resin layer portion: metal filler: Ag
  Resin component: epoxy based
  Thermosetting temperature: 230° C.
  Thickness in length direction z at central portion in height direction x of end-surface-side conductive resin layer portion located at first end surface and second end surface in cross section of multilayer body at ½W position: 10 μm
  Ratio of content of each of metal filler and resin amount: metal filler:resin=70:30
  Specification of plated layer: formed in two layers, forming Ni plated layer on base electrode layer and Sn plated layer on Ni plated layer
Thickness of Ni Plated Layer
  Thickness in length direction z at central portion in height direction x of Ni plated layer located at first end surface and second end surface in cross section of multilayer body at ½W position: 3 μm
  Thickness at central portion in length direction z of Ni plated layer located on first main surface and second main surface, and on first lateral surface and second lateral surface: 3 μm
Thickness of Sn Plated Layer
  Thickness in length direction z at central portion in height direction x of Ni plated layer located at first end surface and second end surface in cross section of multilayer body at ½W position: 4 μm
  Thickness at central portion in length direction z of Ni plated layer located on first main surface and second main surface, and first lateral surface and second lateral surface: 4 μm

(d) Specifications of Material of Comparative Example 3

A multilayer ceramic capacitor of the following specifications was prepared as Comparative Example 3. In other words, a multilayer ceramic capacitor not provided with the conductive resin layer itself on the external electrode was prepared. Other specifications thereof are as follows.
  Dimensions of multilayer ceramic capacitor (design value): L×W×T=3.2 mm×2.5 mm×2.5 mm
  Material of main component of ceramic layer: $BaTiO_3$
  Capacitance: 1 nF
  Rated voltage: 50 V
  Material of internal electrode layer: Ni
Specification of External Electrode Layer
Specification of Base Electrode Layer
  Base electrode layer: fired layer including metal component and glass component
  Metal component: Cu
Thickness of Base Electrode Layer
  Thickness in length direction z at central portion in height direction x of base electrode layer positioned at first end surface and second end surface in cross section of multilayer body at ½W position: 80 μm
  Thickness in height direction x linking first main surface and second main surface at central portion in length direction z of base electrode layer positioned at first main surface and second main surface in cross section of multilayer body at ½W position (thickness of base electrode layer at e dimension central portion): 5 μm
  Thickness in width direction y linking first lateral surface and second lateral surface at central portion in length direction z of base electrode layer positioned at first lateral surface and second lateral surface in cross section of multilayer body at ½T position (thickness of base electrode layer at e dimension central portion): 5 μm
  Specification of plated layer: formed in two layers, forming Ni plated layer on base electrode layer and Sn plated layer on Ni plated layer
Thickness of Ni Plated Layer
  Thickness in length direction z at central portion in height direction x of Ni plated layer located at first end surface and second end surface in cross section of multilayer body at ½W position: 3 μm
  Thickness at central portion in length direction z of Ni plated layer located on first main surface and second main surface, and on first lateral surface and second lateral surface: 3 μm
Thickness of Sn Plated Layer
  Thickness in length direction z at central portion in height direction x of Ni plated layer located at first end surface and second end surface in cross section of multilayer body at ½W position: 4 μm
  Thickness at central portion in length direction z of Ni plated layer located on first main surface and second main surface, and first lateral surface and second lateral surface: 4 μm

(e) Measurement Method of Content Ratio of Metal Filler of Metal Component of End-Surface-Side Conductive Resin Layer Portion The measurement of the content ratio of metal filler of the metal component of the end-surface-side conductive resin layer portion was measured in a cross section, as shown below. In other words, first, polishing was started from the first lateral surface or second lateral surface of the multilayer ceramic capacitor which is the sample, and the central portion in the height direction x of the end-surface-side conductive resin layer portion on the first end surface side or second end surface side was confirmed, in the LT plane polished to the position, which is about ½W in the width direction y linking the first lateral surface and second lateral surface. Alternatively, polishing was started from the first main surface or second main surface of the multilayer ceramic capacitor which is the sample, and the central portion in the width direction y of the end-surface-side conductive resin layer portion on the first end surface side or second end surface side was confirmed, in the LW plane polished to a position which is about ½T in the height direction x linking the first main surface and second main surface. Next, using a scanning electron microscope (SEM), the backscattered electron image was observed with an acceleration voltage of about 5 kV and magnification of about 1000 times, and photographed, so that it was possible to distinguish between the thermosetting resin and other components (metal component (metal filler), voids). Afterwards, the photographed image was binarized into the thermosetting resin and other by image analysis software, and the content ratio of the metal component in the end-surface-side conductive resin layer portion was determined.

The n number, which is the observed number, was established as 100, and the average value of these was established as the content ratio of the metal component in the end-surface-side conductive resin layer portion.

(f) Measurement Method of Content Ratio of Resin Component in End-Surface-Side Conductive Resin Layer Portion The measurement method of the content ratio of resin component in the adjacent conductive resin layer portion was measured in a cross section, as shown below. In other words, first, polishing was started from the first lateral surface or second lateral surface of the multilayer ceramic capacitor which is the sample, and the central portion in the length direction z of the adjacent conductive resin layer portion on the first main surface side or second main surface side was confirmed in the LT plane polished to the position, which is about ½W in the width direction y linking the first lateral surface and second lateral surface. Alternatively, polishing was started from the first main surface or second main surface of the multilayer ceramic capacitor which is the sample, and the central portion in the length direction z of the adjacent conductive resin layer portion on the first lateral surface side or second lateral surface side was confirmed, in the LW plane polished to a position which is about ½T in the height direction x linking the first main surface and second main surface. Next, using a scanning electron microscope (SEM), the backscattered electron image was observed with an acceleration voltage of about 5 kV and magnification of about 1000 times, and photographed, so that it was possible to distinguish between the thermosetting resin and other components (metal component (metal filler), voids). Afterwards, the photographed image was binarized into the thermosetting resin and other by image analysis software, and the content ratio of the resin component in the adjacent conductive resin layer portion was determined.

The n number, which is the observed number, was established as 100, and the average value of these was established as the content ratio of the resin component in the end-surface-side conductive resin layer portion.

(g) Measurement Method of Content Ratio of Metal Filler of Metal Component in Adjacent Conductive Resin Layer Portion The measurement method of the content ratio of the metal component in the adjacent conductive resin layer portion was measured in a cross section, as shown below. In other words, first, polishing was started from the first lateral surface or second lateral surface of the multilayer ceramic capacitor which is the sample, and the central portion in the height direction x of the adjacent conductive resin layer portion on the first main surface side or second main surface side was confirmed in the LT plane polished to the position, which is about ½W in the width direction y linking the first lateral surface and second lateral surface. Alternatively, polishing was started from the first main surface or second main surface of the multilayer ceramic capacitor which is the sample, and the central portion in the length direction z of the adjacent conductive resin layer portion on the first lateral surface side or second lateral surface side was confirmed, in the LW plane polished to a position which is about ½T in the height direction x linking the first main surface and second main surface. Next, using a scanning electron microscope (SEM), the backscattered electron image was observed with an acceleration voltage of about 5 kV and magnification of about 1000 times, and photographed, so that it was possible to distinguish between the thermosetting resin and other components (metal component (metal filler), voids). Afterwards, the photographed image was binarized into the thermosetting resin and other by image analysis software, and the content ratio of the metal component in the adjacent conductive resin layer portion was determined.

The n number, which is the observed number, was established as 100, and the average value of these was established as the content ratio of the metal component in the adjacent conductive resin layer portion.

(h) Measurement Method of Content Ratio of Resin Component in Adjacent Conductive Resin Layer Portion The measurement method of the content ratio of the resin component in the adjacent conductive resin layer portion was measured in a cross section, as shown below. In other words, first, polishing was started from the first lateral surface or second lateral surface of the multilayer ceramic capacitor which is the sample, and the central portion in the length direction z of the adjacent conductive resin layer portion on the first main surface side or second main surface side was confirmed, in the LT plane polished to the position, which is about ½W in the width direction y linking the first lateral surface and second lateral surface. Alternatively, polishing was started from the first main surface or second main surface of the multilayer ceramic capacitor which is the sample, and the central portion in the length direction z of the adjacent conductive resin layer portion on the first lateral surface side or second lateral surface side was confirmed, in the LW plane polished to a position which is about ½T in the height direction x linking the first main surface and second main surface. Next, using a scanning electron microscope (SEM), the backscattered electron image was observed with an acceleration voltage of about 5 kV and magnification of about 1000 times, and photographed, so that it was possible to distinguish between the thermosetting resin and other components (metal component (metal filler), voids). Afterwards, the photographed image was binarized into the thermosetting resin and other by image analysis software, and the content ratio of the resin component in the adjacent conductive resin layer portion was determined.

The n number, which is the observed number, was established as 100, and the average value of these was established as the content ratio of the resin component in the adjacent conductive resin layer portion.

(i) Confirmation Method of Presence/Absence of Cracks by Substrate Bending Test

First, the multilayer ceramic capacitor that is the sample was mounted to a mounting substrate of about 1.6 mm thickness using soldering paste, for example. Afterwards, the substrate was bent using a push rod with an approximately 5-μm diameter from the back surface of the mounting substrate on which the multilayer ceramic capacitor is not mounted, to apply mechanical stress. The retention time at this time was about 60 seconds, and the bending amount was about 17 mm, for example. It should be noted that the this test was set to more severe conditions than normal conditions. After performing the substrate bending, the multilayer ceramic capacitor was removed from the mounting substrate, and the presence/absence of cracks inside of the multilayer body on which cross section polishing is performed was observed. In the cross section polishing, polishing was performed so that the LT plane of the multilayer ceramic capacitor was exposed to a position which is about ½W in the width direction y linking the first lateral surface and second lateral surface of the multilayer ceramic capacitor. As the respective samples of the Examples, and Comparative Examples 1 to 3, 100 units of each were prepared. It should be noted that, in the case of being 20 or less units, it was determined as having an effect.

(j) Measurement Method of ESR

Measurement of ESR was performed by a method as follows. Specifically, first, prior to measurement, heat treatment for 1 hour was performed on the multilayer ceramic capacitor that is the sample at conditions of about 150° C. in an air atmosphere, then mounted to the substrate for measurement, the measurement frequency was set as about 1 MHz after about 24+/−2 hours after the heat treatment completion, for example, and then measured using a network analyzer. As each sample of the Examples, and Comparative Examples 1 to 3, 100 units of each were prepared, and 100 units were then measured, and the average values thereof were established as the measurement value for ESR of each sample of the Examples, and Comparative Examples 1 to 3. It should be noted that 100 mΩ was determined as passing.

(k) Results

Table 1 shows the results from performing confirmation of the presence/absence of cracks inside of the multilayer body by the substrate bending test, and measurement of ESR on each sample of the Examples, and Comparative Examples 1 to 3.

TABLE 1

| | Content percentage of resin component (%) | | Content percentage of metal component (%) | | | |
|---|---|---|---|---|---|---|
| | End-surface-side conductive resin layer part | Adjacent conductive resin layer part | End-surface-side conductive resin layer part | Adjacent conductive resin layer part | ESR (mΩ) | Presence/absence of cracks(number) |
| Comparative Example 1 | 60 | 60 | 40 | 40 | 90 | 20/100 |
| Comparative Example 2 | 60 | 30 | 40 | 70 | 90 | 50/100 |
| Comparative Example 3 | — | — | — | — | 20 | 70/100 |
| Example | 30 | 60 | 70 | 40 | 25 | 0/100 |

According to Table 1, in the samples of Comparative Example 1, the content ratio of the metal component of the end-surface-side conductive resin layer portion and adjacent conductive resin layer portion were both about 40%, for example. Therefore, the measurement result of ESR was about 90 mΩ, for example. However, since the content ratio of the resin component in the end-surface-side conductive resin layer portion and adjacent conductive resin layer portion were both about 60%, for example, as a result of confirming the presence/absence of cracks, 20 cracks occurred among the 100 units. In addition, in Comparative Example 2, since the content ratio of the metal component of the end-surface-side conductive resin layer portion was about 40%, the measurement result of ESR was about 90 mΩ, for example. However, since the content ratio of the resin component in the adjacent conductive resin layer portion was relatively low at about 30%, for example, as a result of confirming the presence/absence of cracks, 50 cracks occurred among the 100 units. Furthermore, in Comparative Example 3, since the conductive resin layer itself is not being formed, the measurement result of ESR was about 20 mΩ, for example. However, as a result of confirming the presence/absence of cracks, 70 cracks occurred among the 100 units.

On the other hand, in the samples of the Examples, since the content ratio of the resin component included in the adjacent conductive resin layer portion was about 60%, and the content ratio of the resin component included in the end-surface-side conductive resin layer portion was about 30%, for example, the content ratio of the resin component included in the adjacent conductive resin layer portion is greater than the content ratio of the resin component included in the end-surface-side conductive resin layer portion. Therefore, the measurement result of ESR is favorable at about 25 mΩ, for example, and as a result of confirming the presence/absence of cracks, a favorable result of 0 among 100 units was obtained.

From the above results, according to the structures of the multilayer ceramic capacitors of the Examples, when defining the total amount of the resin component and metal component in the end-surface-side conductive resin layer portion and adjacent conductive resin layer portion as 100%, since the content ratio of the resin component included in the adjacent conductive resin layer portion is greater than the content ratio of the resin component included in the end-surface-side conductive resin layer portion, the conductivity is maintained, a result of relative low ESR was obtained, and it is possible to reduce or prevent cracking inside of the multilayer body. From the above, according to the multilayer ceramic capacitors according to example embodiments of the present invention, it was confirmed that it can have the desired ESR characteristic, while having mechanical strength in the multilayer ceramic capacitor. 4.

Test Example 2

Next, following the aforementioned production method, samples varying the content ratio of the resin component in each of the end-surface-side conductive resin layer portion and adjacent conductive resin layer portion were prepared, and ESR measurement and evaluation was performed by confirming the presence/absence of cracks in the multilayer body by substrate bending test. In the samples used in test example 2, specifications other than the content ratio of the resin component were the same as the specifications of Example 1 in Test Example 1.

(a) Sample Used in Test Example 2

As shown in Table 2, for the samples of Sample Nos. 1 to 7, samples were prepared in which the content ratio of the resin component in the end-surface-side conductive resin layer portion was about 5%, and varied the content ratio of resin component in the adjacent conductive resin layer portion, for the samples of Sample Nos. 8 to 15, samples were prepared in which the content ratio of the resin component in the end-surface-side conductive resin layer portion was about 10%, and varied the content ratio of the resin component in the adjacent conductive resin layer portion, for the samples of Sample Nos. 16 to 22, samples were prepared in which the content ratio of the resin component in the end-surface-side conductive resin layer portion was about 30%, and varied the content ratio of the resin component in the adjacent conductive resin layer portion, for the samples of Sample Nos. 23 to 26, samples were prepared in which the content ratio of the resin component in the end-surface-side conductive resin layer portion was about 40%, and varied the content ratio of the resin component in the adjacent conductive resin layer portion, for the samples of Sample Nos. 27 to 31, samples were prepared in which the content ratio of the resin component in the end-surface-side conductive resin layer portion was about 60%, and varied the content ratio of the resin component in the adjacent conductive resin layer portion, and for the samples of Sample Nos. 32 to 35, samples were prepared in which the content ratio of the resin component in the end-surface-side conductive resin layer portion was about 65%, and varied the content ratio of the resin component in the adjacent conductive resin layer portion.

(b) Test Method

The confirmation method for the presence/absence of cracks inside of the multilayer body, and ESR measurement method were performed according to the same methods as Test Example 1.

(c) Results

Table 2 shows the results from performing confirmation of the presence/absence of cracks inside of the multilayer body by substrate bending test, and measurement of ESR on each sample of Sample Nos. 1 to 35.

TABLE 2

| Sample no. | Content percentage of resin component (%) | | Content percentage of metal component (%) | | ESR (mΩ) | Presence/absence of cracks(number) |
|---|---|---|---|---|---|---|
| | End-surface-side conductive resin layer part | Adjacent conductive resin layer part | End-surface-side conductive resin layer part | Adjacent conductive resin layer part | | |
| 1 | 5 | 2 | 95 | 98 | 110 | 100/100 |
| 2 | 5 | 5 | 95 | 95 | 110 | 90/100 |
| 3 | 5 | 10 | 95 | 90 | 110 | 20/100 |
| 4 | 5 | 30 | 95 | 70 | 110 | 10/100 |
| 5 | 5 | 40 | 95 | 60 | 110 | 0/100 |
| 6 | 5 | 60 | 95 | 40 | 110 | 0/100 |
| 7 | 5 | 90 | 95 | 10 | 110 | 0/100 |
| 8 | 10 | 5 | 90 | 95 | 20 | 90/100 |
| 9 | 10 | 10 | 90 | 90 | 20 | 80/100 |
| 10 | 10 | 35 | 90 | 65 | 20 | 15/100 |
| 11 | 10 | 40 | 90 | 60 | 20 | 0/100 |
| 12 | 10 | 60 | 90 | 40 | 20 | 0/100 |
| 13 | 10 | 75 | 90 | 25 | 20 | 0/100 |
| 14 | 10 | 90 | 90 | 10 | 20 | 0/100 |
| 15 | 10 | 95 | 90 | 5 | 20 | 10/100 |
| 16 | 30 | 10 | 70 | 90 | 25 | 80/100 |
| 17 | 30 | 30 | 70 | 70 | 25 | 50/100 |
| 18 | 30 | 40 | 70 | 60 | 25 | 0/100 |
| 19 | 30 | 60 | 70 | 40 | 25 | 0/100 |
| 20 | 30 | 75 | 70 | 25 | 25 | 0/100 |
| 21 | 30 | 90 | 70 | 10 | 25 | 0/100 |
| 22 | 30 | 95 | 70 | 5 | 25 | 10/100 |

TABLE 2-continued

| Sample no. | Content percentage of resin component (%) | | Content percentage of metal component (%) | | ESR (mΩ) | Presence/ absence of cracks(number) |
|---|---|---|---|---|---|---|
| | End-surface-side conductive resin layer part | Adjacent conductive resin layer part | End-surface-side conductive resin layer part | Adjacent conductive resin layer part | | |
| 23 | 40 | 30 | 60 | 70 | 45 | 50/100 |
| 24 | 40 | 50 | 60 | 50 | 45 | 0/100 |
| 25 | 40 | 70 | 60 | 30 | 45 | 0/100 |
| 26 | 40 | 95 | 60 | 5 | 45 | 15/100 |
| 27 | 60 | 30 | 40 | 70 | 90 | 50/100 |
| 28 | 60 | 60 | 40 | 40 | 90 | 20/100 |
| 29 | 60 | 70 | 40 | 30 | 90 | 0/100 |
| 30 | 60 | 90 | 40 | 10 | 90 | 0/100 |
| 31 | 60 | 95 | 40 | 5 | 90 | 15/100 |
| 32 | 65 | 50 | 35 | 50 | 120 | 0/100 |
| 33 | 65 | 65 | 35 | 35 | 120 | 5/100 |
| 34 | 65 | 90 | 35 | 10 | 120 | 0/100 |
| 35 | 65 | 95 | 35 | 5 | 120 | 15/100 |

Each sample of Sample Nos. 1 to 7 had a content ratio of the resin component in the end-surface-side conductive resin layer portion of about 5%, which is less than about 10%, for example. Therefore, the ESR value was about 110 mΩ, for example. This shows that the content ratio required as the resin component in the end-surface-side conductive resin layer portion existed, apart from the content ratio of the resin component in the adjacent conductive resin layer portion. In the samples of Sample Nos. 1 and 2, the content ratio of the resin component in the end-surface-side conductive resin layer portion is at least the content ratio of the resin component in the adjacent conductive resin layer portion, and the content ratio of the resin component in the end-surface-side conductive resin layer portion and the content ratio of the resin component in the adjacent conductive resin layer portion are both relatively low. Therefore, in the samples of Sample No. 1, there was cracking inside of the multilayer body in 100 samples among the 100 units, and in the samples of Sample No. 2, there was cracking inside of the multilayer body in 90 samples among the 100 units. It should be noted, in each sample of Sample Nos. 3 to 7, the ESR was about 110 mΩ, for example. However, since the content ratio of the resin component in the adjacent conductive resin layer portion was at least about 10%, the samples generating cracks inside of the multilayer body were a relatively smaller number of samples at no more than 20 among 100 even in the samples of any sample numbers.

For each sample of Sample Nos. 8 to 15, the content ratio of the resin component in the end-surface-side conductive resin layer portion was about 10%, for example. However, in the samples of Sample Nos. 8 and 9, since the content ratio of the resin component in the end-surface-side conductive resin layer portion is at least the content ratio of the resin component in the adjacent conductive resin layer portion, in the samples of Sample No. 8, there were cracks inside of the multilayer body in 90 samples among 100 units, and in the samples of Sample No. 9, there were cracks inside of the multilayer body in 80 samples among 100 units. On the other hand, in each sample of Sample Nos. 10 to 15, ESR was no more than about 100 mΩ at about 20 mΩ, for example and thus the samples generating cracks inside of the multilayer body were a relatively small number of samples at no more than 15 among 100 units in the samples of any sample number. In particular, in Sample Nos. 11 to 14, since the content ratio of the resin component in the adjacent conductive resin layer portion was at least about 40% and no more than about 90%, for example, the samples with cracking were 0 among 100 units.

In each sample of Sample Nos. 16 to 22, the content ratio of the resin component in the end-surface-side conductive resin layer portion was about 30%, for example. However, in the samples of Sample Nos. 16 and 17, since the content ratio of the resin component of the end-surface-side conductive resin layer portion was at least the content ratio of the resin component of the adjacent conductive resin layer portion, there was cracking inside of the multilayer body in 80 samples among 100 units for the samples of Sample No. 16, and there was cracking inside of the multilayer body in 50 samples among 100 units for the samples of Sample No. 17. On the other hand, in each sample of Sample Nos. 18 to 22, the ESR was no more than about 100 mΩ at about 25 mΩ, for example, and the samples generating cracks inside of the multilayer body were a relatively smaller number of samples at no more than 10 among 100 even in the samples of any sample number. In particular, in Sample No. 18 to 21, since the content ratio of the resin component in the adjacent conductive resin layer portion was at least about 40% and no more than about 90%, for example, samples with cracks were 0 among 100 units.

In each sample of Sample Nos. 23 to 26, the content ratio of the resin component in the end-surface-side conductive resin layer portion was about 40%, for example. However, in the samples of Sample No. 23, since the content ratio of the resin component in the end-surface-side conductive resin layer portion was at least the content ratio of the resin component in the adjacent conductive resin layer portion, there was cracking inside of the multilayer body in 50 samples among 100 units for the samples of Sample No. 23. On the other hand, in each sample of Sample Nos. 24 to 26, the ESR was no more than about 100 mΩ at about 45 mΩ, for example, and the samples generating cracks inside of the multilayer body were a relatively small number of samples at no more than 15 among 100 even in the samples of any sample number. In particular, in Sample Nos. 24 and 25, since the content ratio of the resin component in the adjacent conductive resin layer portion was at least about 40% and no more than about 90%, for example, samples with cracks were 0 among 100 units.

In each sample of Sample Nos. 27 to 31, the content ratio of the resin component in the end-surface-side conductive resin layer portion was about 60%, for example. However, in the samples of Sample No. 27 and 28, since the content ratio of the resin component in the end-surface-side conductive resin layer portion was at least the content ratio of the resin component in the adjacent conductive resin layer portion, in the samples of Sample No. 27, there were cracks inside of the multilayer body in 50 samples among 100 units, and in the samples of Sample No. 28, there were cracks inside of the multilayer body in 20 samples among 100 units. On the other hand, in each sample of Sample Nos. 29 to 31, the ESR was no more than about 100 mΩ at about 90 mΩ, for example, and the samples generating cracks inside of the multilayer body were a relatively small number of samples at no more than 15 among 100 even in the samples of any sample number. In particular, in Sample Nos. 29 and 30, since the content ratio of the resin component in the adjacent conductive resin layer portion was at least about 40% and no more than about 90%, for example, the samples with cracks were 0 among 100 units.

In each sample of Sample Nos. 32 to 35, since the content ratio of the resin component in the end-surface-side conductive resin layer portion was about 65%, for example, the ESR value was about 120 mΩ, for example. It should be noted that, in each sample of Sample Nos. 32 to 35, since the content ratio of the resin component in the end-surface-side conductive resin layer portion was about 65%, for example, the samples generating cracks inside of the multilayer body was a relatively small number of samples at no more than 15 among 100 even in the samples of any sample number.

Based on the above results, when defining the total amount of the resin component and metal component in the end-surface-side conductive resin layer portion as 100%, in the case of establishing the content ratio of the resin component in the end-surface-side conductive resin layer portion as at least about 10% and no more than about 60%, and when defining the total amount of the resin component and metal component in the adjacent conductive resin layer portion as 100%, in the case of establishing the content ratio of the resin component in the adjacent conductive resin layer portion as at least about 40% and no more than about 90%, for example, it was confirmed to obtain a multilayer ceramic capacitor having the desired ESR and without generating cracks. In other words, when defining the total amount of the resin component and metal component in the end-surface-side conductive resin layer portion as 100%, in the case of establishing the content ratio of the metal component in the end-surface-side conductive resin layer portion as at least about 40% and no more than about 90%, and when defining the total amount of the resin component and metal component in the adjacent conductive resin layer portion as 100%, in the case of establishing the content ratio of the metal component in the adjacent conductive resin layer portion as at least about 10% and no more than about 60%, for example, it was confirmed to obtain a multilayer ceramic capacitor having the desired ESR and without generating cracks.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
a multilayer body including a plurality of laminated ceramic layers, a first main surface and a second main surface opposite in a height direction, a first lateral surface and a second lateral surface opposite in a width direction which is orthogonal or substantially orthogonal to the height direction, and a first end surface and a second end surface opposite in a length direction which is orthogonal or substantially orthogonal to the height direction and the width direction; a first internal electrode layer provided on the plurality of ceramic layers and exposed at the first end surface; a second internal electrode layer provided on the plurality of ceramic layers and exposed at the second end surface; a first external electrode electrically connected with the first internal electrode layer and provided on the first end surface at a portion of the first main surface, at a portion of the second main surface, at a portion of the first lateral surface and at a portion of the second lateral surface; and a second external electrode electrically connected with the second internal electrode layer and provided on the second end surface at a portion of the first main surface, at a portion of the second main surface, at a portion of the first lateral surface and at a portion of the second lateral surface; wherein the first external electrode and the second external 92 electrode include a base electrode layer including a metal component and a glass component, a conductive resin layer including a metal component and a resin component provided on the base electrode layer, and a plated layer provided on the conductive resin layer; the conductive resin layer includes an end-surface-side conductive resin layer portion located on the first end surface and the second end surface, and an adjacent conductive resin layer portion extending from an end portion of the end-surface-side conductive resin layer portion to be located on the first main surface, on the second main surface, on the first lateral surface and on the second lateral surface; when defining a total amount of resin component and metal component in the end-surface-side conductive resin layer portion and the adjacent conductive resin layer portion as 100%, a content ratio of the resin component included in the adjacent conductive resin layer portion is greater than a content ratio of the resin component included in the end-surface-side conductive resin layer portion, and a content ratio of the resin component in the end-surface-side conductive resin layer portion is at least about 10% and no more than about 60%, and the adjacent conductive resin layer portion includes the resin component and the metal component.

2. The multilayer ceramic electronic component according to claim 1, wherein the content ratio of the resin component in the adjacent conductive resin layer portion, when defining a total amount of the resin component and the metal component in the adjacent conductive resin layer portion as 100%, is at least about 40% and no more than about 90%.

3. The multilayer ceramic electronic component according to claim 1, wherein
the content ratio of the metal component in the end-surface-side conductive resin layer portion, when defining a total amount of the resin component and metal component in the end-surface-side conductive resin layer portion as 100%, is at least about 40% and no more than about 90%; and
the content ratio of the metal component in the adjacent conductive resin layer portion, when defining a total amount of the resin component and the metal component in the adjacent conductive resin layer portion as 100%, is at least about 10% and no more than about 60%.

4. The multilayer ceramic electronic component according to claim 1, wherein the multilayer body has a rectangular or substantially rectangular parallelepiped shape.

5. The multilayer ceramic electronic component according to claim 1, wherein the multilayer body includes rounded corner portions and rounded ridge portions.

6. The multilayer ceramic electronic component according to claim 1, wherein a number of the plurality of ceramic layers is at least 10 and no more than 700.

7. The multilayer ceramic electronic component according to claim 1, wherein a thickness of each of the plurality of ceramic layers is at least about 0.5 μm and no more than about 15.0 μm.

8. The multilayer ceramic electronic component according to claim 1, wherein each of the plurality of ceramic layers includes $BaTiO_3$, $CaTiO_3$, $SrTiO_3$ or $CaZrO_3$.

9. The multilayer ceramic electronic component according to claim 8, wherein each of the plurality of ceramic layers further includes Mn compound, Fe compound, Cr compound, Co compound, or Ni compound.

10. The multilayer ceramic electronic component according to claim 1, wherein each of the plurality of ceramic layers includes a piezoelectric ceramic material, a semiconductor ceramic material, a spinel ceramic material, or a magnetic ceramic material.

11. The multilayer ceramic electronic component according to claim 1, wherein each of the first and second internal electrode layers includes Ni, Cu, Ag, Pd or Au, or alloys including at least one of Ni, Cu, Ag, Pd or Au.

12. The multilayer ceramic electronic component according to claim 1, wherein each of the first and second internal electrode layers has a thickness of about 0.2 μm and no more than about 2.0 μm.

13. The multilayer ceramic electronic component according to claim 1, wherein the multilayer body includes a floating internal electrode.

14. The multilayer ceramic electronic component according to claim 13, wherein the multilayer body includes a counter electrode portion that is divided into two or more portions by the floating internal electrode.

15. The multilayer ceramic electronic component according to claim 1, wherein a plurality of capacitor components are provided between the first and second internal electrode layers and connected in parallel.

16. The multilayer ceramic electronic component according to claim 1, wherein the base electrode layer includes a first base electrode layer and a second base electrode layer.

17. The multilayer ceramic electronic component according to claim 1, wherein the base electrode layer includes at least one of $BaTiO_3$, $CaTiO_3$, $(Ba,Ca)TiO_3$, $SrTiO_3$, or $CaZrO_3$.

18. The multilayer ceramic electronic component according to claim 1, wherein a ceramic material of the plurality of ceramic layers is the same as a ceramic material of the base electrode layer.

19. The multilayer ceramic electronic component according to claim 1, wherein a ceramic material of the plurality of ceramic layers is different than a ceramic material of the base electrode layer.

20. The multilayer ceramic electronic component according to claim 1, wherein a thickness of the base electrode layer is about 2 μm and no more than about 220 μm.

* * * * *